United States Patent
Chen et al.

(10) Patent No.: US 10,506,632 B2
(45) Date of Patent: Dec. 10, 2019

(54) METHOD AND APPARATUS FOR MONITORING PHYSICAL DOWNLINK CONTROL CHANNEL (PDCCH) IN A WIRELESS COMMUNICATION SYSTEM

(71) Applicant: ASUSTek Computer Inc., Taipei (TW)

(72) Inventors: I-Jen Chen, Taipei (TW); Richard Lee-Chee Kuo, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 56 days.

(21) Appl. No.: 15/942,880

(22) Filed: Apr. 2, 2018

(65) Prior Publication Data

US 2018/0343673 A1    Nov. 29, 2018

Related U.S. Application Data

(60) Provisional application No. 62/511,093, filed on May 25, 2017.

(51) Int. Cl.
*H04W 74/04* (2009.01)
*H04W 74/00* (2009.01)
*H04W 74/08* (2009.01)

(52) U.S. Cl.
CPC ......... *H04W 74/04* (2013.01); *H04W 74/006* (2013.01); *H04W 74/0833* (2013.01)

(58) Field of Classification Search
CPC ............... H04W 74/04; H04W 74/006; H04W 74/0833; H04W 24/10; H04W 52/0274; H04W 52/0254; H04L 27/2502; H04L 27/2646; H04L 5/0007; H04J 11/0079;

(Continued)

(56) References Cited

U.S. PATENT DOCUMENTS

2016/0270018 A1* 9/2016 He .................... H04W 56/0025
2017/0111930 A1* 4/2017 Rajagopal ............ H04B 7/0626
2017/0164349 A1    6/2017 Zhu (Continued)

FOREIGN PATENT DOCUMENTS

CN        106231637        12/2016
CN        107223359        9/2017

(Continued)

OTHER PUBLICATIONS

Samsung: "Numerology Configuration in NR", 3GPP Draft; Release 2—1704506, France vol. RAN WG2, XP051275069, May 14, 2017.*

(Continued)

*Primary Examiner* — Afsar M Qureshi
(74) *Attorney, Agent, or Firm* — Blue Capital Law Firm, P.C.

(57) ABSTRACT

A method and apparatus are disclosed from the perspective of a UE. In one embodiment, the method includes receiving a signalling from a network node to trigger a non-contention based random access procedure, wherein the signalling includes a first information indicating a first numerology and a second information indicating a second numerology. The method also includes transmitting a random access preamble based on the second numerology to the network node. The method further includes receiving a random access response from the network node. In addition, the method includes monitoring a control channel for scheduling a new transmission based on the first numerology.

20 Claims, 25 Drawing Sheets

(58) Field of Classification Search
CPC ... H04B 7/0695; H04B 7/0617; H04B 7/0626
See application file for complete search history.

(56) References Cited

U.S. PATENT DOCUMENTS

| | | | | |
|---|---|---|---|---|
| 2018/0063818 | A1* | 3/2018 | Chen | H04W 24/02 |
| 2018/0098298 | A1* | 4/2018 | Jung | H04L 27/266 |
| 2018/0192255 | A1* | 7/2018 | Guo | H04L 12/189 |
| 2018/0192347 | A1* | 7/2018 | Shaheen | H04W 36/36 |
| 2018/0234153 | A1* | 8/2018 | Lincoln | H04B 7/0486 |
| 2018/0343153 | A1* | 11/2018 | Zhang | H04L 27/2602 |
| 2019/0239248 | A1* | 8/2019 | Zhang | H04W 72/14 |

FOREIGN PATENT DOCUMENTS

| | | |
|---|---|---|
| TW | 201644246 | 12/2016 |
| WO | 2017184341 | 10/2017 |
| WO | WO2017184341 | * 10/2017 |

OTHER PUBLICATIONS

Sharp: "Numerology Change and Mixed Numerologies", 3GPP Draft, Release 2—1705668, France vol. RAN WG2, XP051275982, May 14, 2017.*

3GPP TS 36.300 v14.2.0, "3rd Generation Partnership Project; Technical Specification Group Radio Access Network; Evolved Universal Terrestrial Radio Access (E-ULTRA) and Evolved Universal Terrestrial Radio Access Network (E-UTRAN); Overall description; Stage 2 (Release 14)", Apr. 19, 2017.

3GPP TS 36.321 v14.2.1, "3rd Generation Partnership Project; Technical Specification Group Radio Access Network; Evolved Universal Terrestrial Radio Access (E-ULTRA); Medium Access Control (MAC) protocol specification (Release 14)", Apr. 27, 2017.

Office Action from Taiwan Patent Office in corresponding TW Application No. 107111711, dated Apr. 29, 2019.

Fujitsu, Discussion on PRACH configuration in NR [online], 3GPP TSG RAN WG1 adhoc_NR_AH_1701, 3GPP, Jan. 20, 2017, R1-1700653, Search Date [Feb. 12, 2019], Internet<URL:http://www.3gpp.org/ftp/tsg_ran/Wg1_RL1/TSGR1_AH/NR_AH_1701/Docs/R1-1700653.zip>.

Samsung, 4-step RACH procedure [online], 3GPP TSG RAN WG1 #89, 3GPP, May 19, 2017, R1-1707933, Search Date [Feb. 12, 2019], Internet<URL: http://www.3gpp.org/ftp/tsg_ran/WG1_RL1/TSGR1_89/Docs/R1-1707933.zip>.

Office Action from Japan Patent Office in corresponding JP Application No. 2018-070571, dated Feb. 26, 2019.

Samsung: "Numerology configuration in NR", 3GPP Draft; R2-1704506 Numerology Configuration in NR, 3rd Generation Partnership Project (3GPP), Mobile Competence Centre ; 650, Route Des Lucioles ; F-06921 Sophia-Antipolis Cedex:France vol. RAN WG2, No. Hangzhou, China; May 15, 2017-May 19, 2017 May 14, 2017(May 14, 2017), XP051275069.

Sharp: "Numerology change and mixed numerologies", 3GPP Draft; R2-1705668—Numerology Change and Mixed Numerologies, 3rd Generation Partnership Project (3GPP), Mobile Competence Centre ; 650, Route Des Lucioles ; F-06921 Sophia-Antipolis Cedex : Fran vol. RAN WG2, No. Hangzhou, China; May 15, 2017-May 19, 2017 May 14, 2017 (May 14, 2017), XP051275982.

European Search Report in corresponding EP Application No. 18165359.3, dated Oct. 9, 2018.

* cited by examiner

US 10,506,632 B2

METHOD AND APPARATUS FOR MONITORING PHYSICAL DOWNLINK CONTROL CHANNEL (PDCCH) IN A WIRELESS COMMUNICATION SYSTEM

CROSS-REFERENCE TO RELATED APPLICATIONS

The present Application claims the benefit of U.S. Provisional Patent Application Ser. No. 62/511,093 filed on May 25, 2017, the entire disclosure of which is incorporated herein in its entirety by reference.

FIELD

This disclosure generally relates to wireless communication networks, and more particularly, to a method and apparatus for monitoring PDCCH in a wireless communication system.

BACKGROUND

With the rapid rise in demand for communication of large amounts of data to and from mobile communication devices, traditional mobile voice communication networks are evolving into networks that communicate with Internet Protocol (IP) data packets. Such IP data packet communication can provide users of mobile communication devices with voice over IP, multimedia, multicast and on-demand communication services.

An exemplary network structure is an Evolved Universal Terrestrial Radio Access Network (E-UTRAN). The E-UTRAN system can provide high data throughput in order to realize the above-noted voice over IP and multimedia services. A new radio technology for the next generation (e.g., 5G) is currently being discussed by the 3GPP standards organization. Accordingly, changes to the current body of 3GPP standard are currently being submitted and considered to evolve and finalize the 3GPP standard.

SUMMARY

A method and apparatus are disclosed from the perspective of a UE (User Equipment). In one embodiment, the method includes receiving a signalling from a network node to trigger a non-contention based random access procedure, wherein the signalling includes a first information indicating a first numerology and a second information indicating a second numerology. The method also includes transmitting a random access preamble based on the second numerology to the network node. The method further includes receiving a random access response from the network node. In addition, the method includes monitoring a control channel for scheduling a new transmission based on the first numerology.

DETAILED DESCRIPTION

The exemplary wireless communication systems and devices described below employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A or LTE-Advanced (Long Term Evolution Advanced), 3GPP2 UMB (Ultra Mobile Broadband), WiMax, or some other modulation techniques.

In particular, the exemplary wireless communication systems devices described below may be designed to support one or more standards such as the standard offered by a consortium named "3rd Generation Partnership Project"

referred to herein as 3GPP, including: TS 36.321 V12.7.0, "E-UTRA MAC protocol specification (Release 12)"; TS 36.300 v13.4.0, "E-UTRA and E-UTRAN; Overall description; Stage 2 (Release 13)"; TR 38.913 V14.0.0, "Study on Scenarios and Requirements for Next Generation Access Technologies"; RAN1 #86bis meeting minutes; RAN2 #95 meeting minutes; RAN2 AdHoc meeting on NR; RAN2 #97 meeting minutes; RAN2 #97bis meeting minutes; R1-1704193, "Numerology for DL control channel", Huawei and HiSilicon; R2-1702599, "Considerations on RACH procedure", Huawei and HiSilicon; and TR 38.804 V14.0.0, "Study on New Radio Access Technology; Radio Interface Protocol Aspects (Release 14)". The standards and documents listed above are hereby expressly incorporated by reference in their entirety.

Figure 1:
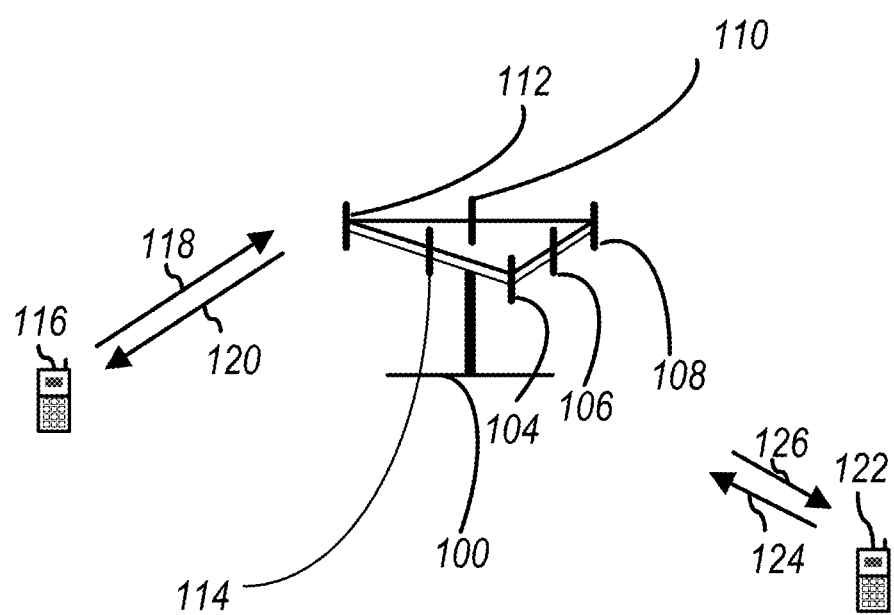
FIG. 1 shows a diagram of a wireless communication system according to one exemplary embodiment.

FIG. 1 shows a multiple access wireless communication system according to one embodiment of the invention. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal (AT) 122 is in communication with antennas 106 and 108, where antennas 106 and 108 transmit information to access terminal (AT) 122 over forward link 126 and receive information from access terminal (AT) 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access network. In the embodiment, antenna groups each are designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage causes less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an evolved Node B (eNB), or some other terminology. An access terminal (AT) may also be called user equipment (UE), a wireless communication device, terminal, access terminal or some other terminology.

Figure 2:
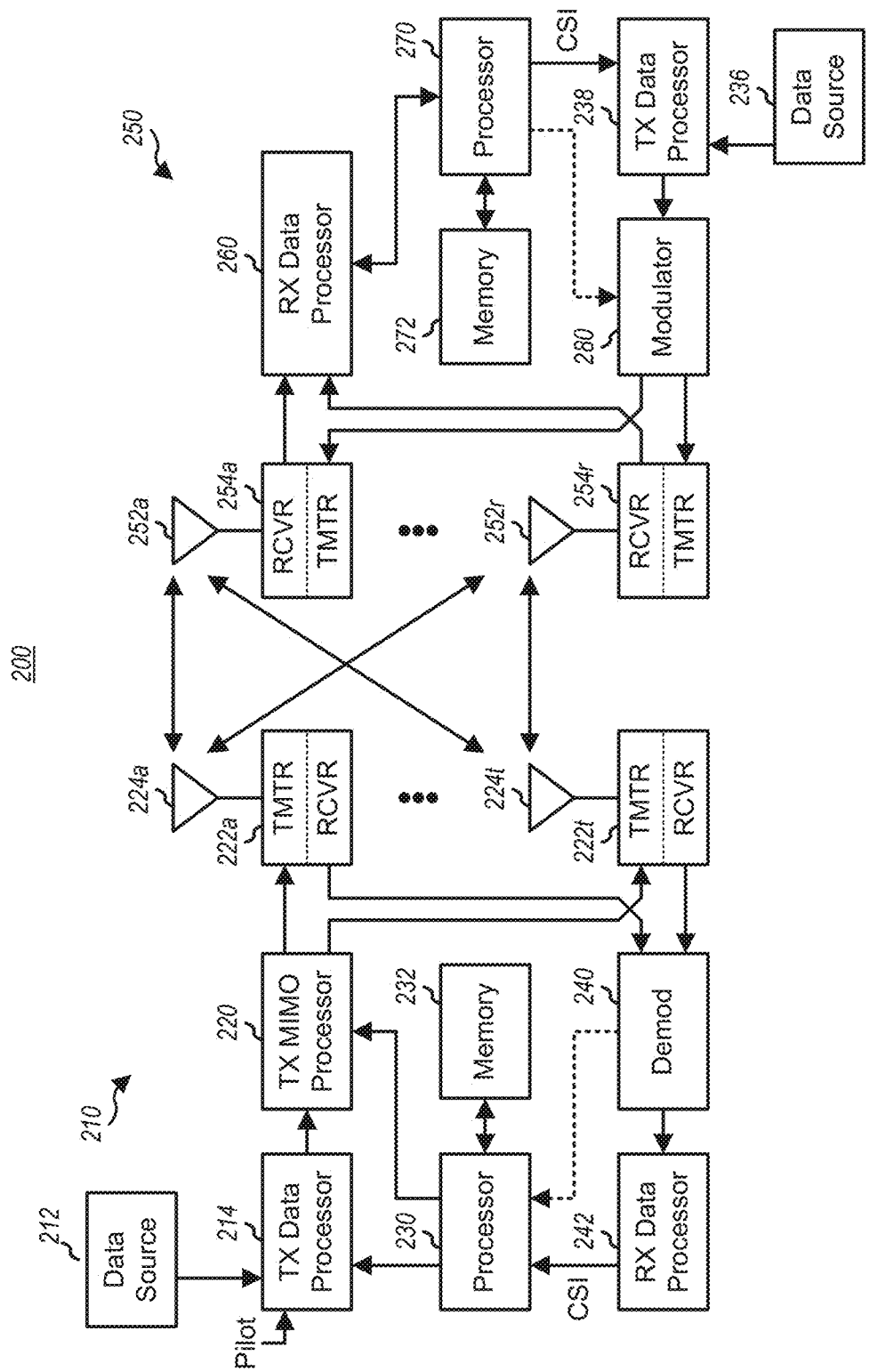
FIG. 2 is a block diagram of a transmitter system (also known as access network) and a receiver system (also known as user equipment or UE) according to one exemplary embodiment.

FIG. 2 is a simplified block diagram of an embodiment of a transmitter system 210 (also known as the access network) and a receiver system 250 (also known as access terminal (AT) or user equipment (UE)) in a MIMO system 200. At the transmitter system 210, traffic data for a number of data streams is provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QPSK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
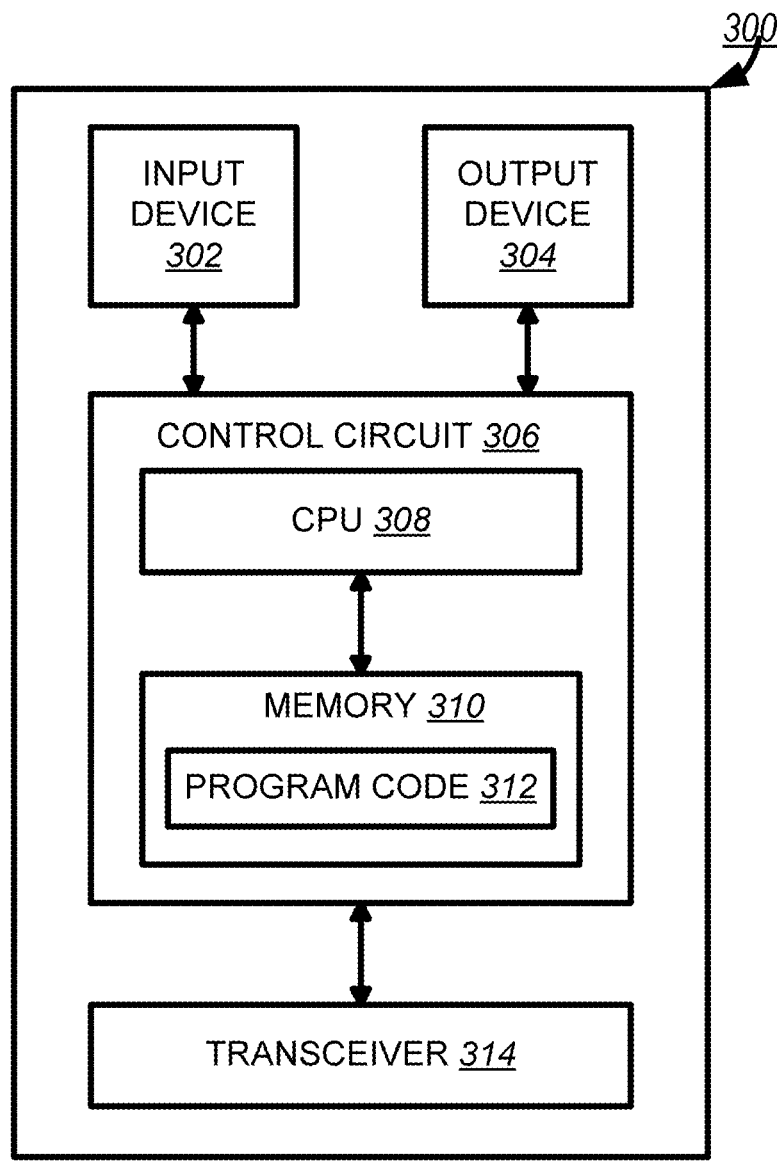
FIG. 3 is a functional block diagram of a communication system according to one exemplary embodiment.

Turning to FIG. 3, this figure shows an alternative simplified functional block diagram of a communication device according to one embodiment of the invention. As shown in FIG. 3, the communication device 300 in a wireless communication system can be utilized for realizing the UEs (or ATs) 116 and 122 in FIG. 1 or the base station (or AN) 100 in FIG. 1, and the wireless communications system is preferably the LTE system. The communication device 300 may include an input device 302, an output device 304, a control circuit 306, a central processing unit (CPU) 308, a memory 310, a program code 312, and a transceiver 314. The control circuit 306 executes the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 is used to receive and transmit wireless signals, delivering received signals to the control circuit 306, and outputting signals generated by the control circuit 306 wirelessly. The communication device 300 in a wireless communication system can also be utilized for realizing the AN 100 in FIG. 1.

Figure 4:
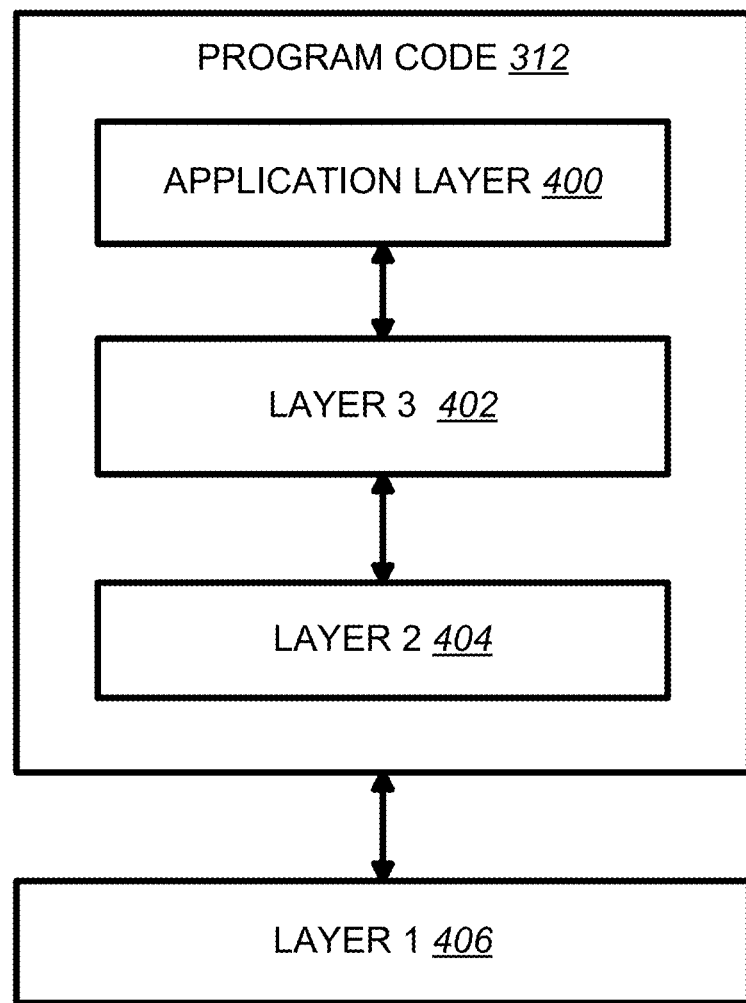
FIG. 4 is a functional block diagram of the program code of FIG. 3 according to one exemplary embodiment.

FIG. 4 is a simplified block diagram of the program code 312 shown in FIG. 3 in accordance with one embodiment of the invention. In this embodiment, the program code 312 includes an application layer 400, a Layer 3 portion 402, and a Layer 2 portion 404, and is coupled to a Layer 1 portion 406. The Layer 3 portion 402 generally performs radio resource control. The Layer 2 portion 404 generally performs link control. The Layer 1 portion 406 generally performs physical connections.

In LTE, two types of random access (RA) procedure are defined: contention-based and contention-free (non-contention-based). Section 10.1.5 of 3GPP TS 36.300 describes RA procedure as follows:

The random access procedure is performed for the following events related to the PCell:
Initial access from RRC_IDLE;
RRC Connection Re-establishment procedure;
Handover;
DL data arrival during RRC_CONNECTED requiring random access procedure:
E.g. when UL synchronisation status is "non-synchronised".
UL data arrival during RRC_CONNECTED requiring random access procedure:
E.g. when UL synchronisation status is "non-synchronised" or there are no PUCCH resources for SR available.
For positioning purpose during RRC_CONNECTED requiring random access procedure;
E.g. when timing advance is needed for UE positioning.

The random access procedure is also performed on a SCell to establish time alignment for the corresponding sTAG.

Furthermore, the random access procedure takes two distinct forms:
Contention based (applicable to first five events);
Non-contention based (applicable to only handover, DL data arrival, positioning and obtaining timing advance alignment for a sTAG).

Normal DL/UL transmission can take place after the random access procedure.
[ . . . ]
The four steps of the contention based random access procedures are:
1) Random Access Preamble on RACH in uplink (Msg1):
There are two possible groups defined and one is optional. If both groups are configured the size of message 3 and the pathloss are used to determine which group a preamble is selected from. The group to which a preamble belongs provides an indication of the size of the message 3 and the radio conditions at the UE. The preamble group information along with the necessary thresholds are broadcast on system information.
2) Random Access Response generated by MAC on DL-SCH (Msg2):
Semi-synchronous (within a flexible window of which the size is one or more TTI) with message 1;
No HARQ;
Addressed to RA-RNTI on PDCCH;
Conveys at least RA-preamble identifier, Timing Alignment information for the pTAG, initial UL grant and assignment of Temporary C-RNTI (which may or may not be made permanent upon Contention Resolution);
Intended for a variable number of UEs in one DL-SCH message.
3) First scheduled UL transmission on UL-SCH (Msg3):
Uses HARQ;
Size of the transport blocks depends on the UL grant conveyed in step 2.
For initial access:
Conveys the RRC Connection Request generated by the RRC layer and transmitted via CCCH;
Conveys at least NAS UE identifier but no NAS message;
RLC TM: no segmentation.
For RRC Connection Re-establishment procedure:
Conveys the RRC Connection Re-establishment Request generated by the RRC layer and transmitted via CCCH;
RLC TM: no segmentation;
Does not contain any NAS message.
After handover, in the target cell:
Conveys the ciphered and integrity protected RRC Handover Confirm generated by the RRC layer and transmitted via DCCH;
Conveys the C-RNTI of the UE (which was allocated via the Handover Command);
Includes an uplink Buffer Status Report when possible.
For other events:
Conveys at least the C-RNTI of the UE.
4) Contention Resolution on DL (Msg4):
Early contention resolution shall be used i.e. eNB does not wait for NAS reply before resolving contention;
Not synchronised with message 3;
HARQ is supported;
Addressed to:
The Temporary C-RNTI on PDCCH for initial access and after radio link failure;
The C-RNTI on PDCCH for UE in RRC_CONNECTED.
HARQ feedback is transmitted only by the UE which detects its own UE identity, as provided in message 3, echoed in the Contention Resolution message;
For initial access and RRC Connection Re-establishment procedure, no segmentation is used (RLC-TM).

The Temporary C-RNTI is promoted to C-RNTI for a UE which detects RA success and does not already have a C-RNTI; it is dropped by others. A UE which detects RA success and already has a C-RNTI, resumes using its C-RNTI.
[ . . . ]
The three steps of the non-contention based random access procedures are:

0) Random Access Preamble assignment via dedicated signalling in DL:
   eNB assigns to UE a non-contention Random Access Preamble (a Random Access Preamble not within the set sent in broadcast signalling).
   Signalled via:
   HO command generated by target eNB and sent via source eNB for handover;
   PDCCH in case of DL data arrival or positioning;
   PDCCH for initial UL time alignment for a sTAG.
1) Random Access Preamble on RACH in uplink:
   UE transmits the assigned non-contention Random Access Preamble.
2) Random Access Response on DL-SCH:
   Semi-synchronous (within a flexible window of which the size is two or more TTIs) with message 1;
   No HARQ;
   Addressed to RA-RNTI on PDCCH;
   Conveys at least:
      Timing Alignment information and initial UL grant for handover;
      Timing Alignment information for DL data arrival;
      RA-preamble identifier;
      Intended for one or multiple UEs in one DL-SCH message.

When performing non-contention based random access on the PCell while CA is configured, the Random Access Preamble assignment via PDCCH of step 0, step 1 and 2 of the non-contention based random access procedure occur on the PCell. In order to establish timing advance for a sTAG, the eNB may initiate a non-contention based random access procedure with a PDCCH order (step 0) that is sent on a scheduling cell of activated SCell of the sTAG. Preamble transmission (step 1) is on the indicated SCell and Random Access Response (step 2) takes place on PCell.

When performing non-contention based random access on the PCell or PSCell while DC is configured, the Random Access Preamble assignment via PDCCH of step 0, step 1 and 2 of the non-contention based random access procedure occur on the corresponding cell. In order to establish timing advance for a sTAG, the eNB may initiate a non-contention based random access procedure with a PDCCH order (step 0) that is sent on a scheduling cell of activated SCell of the sTAG not including PSCell. Preamble transmission (step 1) is on the indicated SCell and Random Access Response (step 2) takes place on PCell for MCG and PSCell for SCG.

Additional detail of LTE random access (RA) procedure is captured in the LTE MAC specification (3GPP TS 36.321) as follows:

5.1 Random Access Procedure
5.1.1 Random Access Procedure Initialization

The Random Access procedure described in this subclause is initiated by a PDCCH order, by the MAC sublayer itself or by the RRC sublayer. Random Access procedure on an SCell shall only be initiated by a PDCCH order. If a MAC entity receives a PDCCH transmission consistent with a PDCCH order [5] masked with its C-RNTI, and for a specific Serving Cell, the MAC entity shall initiate a Random Access procedure on this Serving Cell. For Random Access on the SpCell a PDCCH order or RRC optionally indicate the ra-PreambleIndex and the ra-PRACH-Maskindex; and for Random Access on an SCell, the PDCCH order indicates the ra-Preambleindex with a value different from 000000 and the ra-PRACH-Maskindex. For the pTAG preamble transmission on PRACH and reception of a PDCCH order are only supported for SpCell. Before the procedure can be initiated, the following information for related Serving Cell is assumed to be available [8]:

the available set of PRACH resources for the transmission of the Random Access Preamble, prach-ConfigIndex.

the groups of Random Access Preambles and the set of available Random Access Preambles in each group (SpCell only):
The preambles that are contained in Random Access Preambles group A and Random Access Preambles group B are calculated from the parameters numberOfRA-Preambles and sizeOfRA-PreamblesGroupA:
If sizeOfRA-PreamblesGroupA is equal to numberOfRA-Preambles then there is no Random Access Preambles group B. The preambles in Random Access Preamble group A are the preambles 0 to sizeOfRA-PreamblesGroupA—1 and, if it exists, the preambles in Random Access Preamble group B are the preambles sizeOfRA-PreamblesGroupA to numberOfRA-Preambles—1 from the set of 64 preambles as defined in [7].

if Random Access Preambles group B exists, the thresholds, messagePowerOffsetGroupB and messageSizeGroupA, the configured UE transmitted power of the Serving Cell performing the Random Access Procedure, $P_{CMAX,c}$ [10], and the offset between the preamble and Msg3, deltaPreambleMsg3, that are required for selecting one of the two groups of Random Access Preambles (SpCell only).

the RA response window size ra-ResponseWindowSize.
the power-ramping factor powerRampingStep.
the maximum number of preamble transmission preambleTransMax.
the initial preamble power preambleInitialReceivedTargetPower.
the preamble format based offset DELTA_PREAMBLE (see subclause 7.6).
the maximum number of Msg3 HARQ transmissions maxHARQ-Msg3Tx (SpCell only).
the Contention Resolution Timer mac-ContentionResolutionTimer (SpCell only).

NOTE: The above parameters may be updated from upper layers before each Random Access procedure is initiated.

The Random Access procedure shall be performed as follows:
Flush the Msg3 buffer;
set the PREAMBLE_TRANSMISSION_COUNTER to 1;
set the backoff parameter value to 0 ms;
for the RN, suspend any RN subframe configuration;
proceed to the selection of the Random Access Resource (see subclause 5.1.2).

NOTE: There is only one Random Access procedure ongoing at any point in time in a MAC entity. If the MAC entity receives a request for a new Random Access procedure while another is already ongoing in the MAC entity, it is up to UE implementation whether to continue with the ongoing procedure or start with the new procedure.

5.1.2 Random Access Resource Selection

The Random Access Resource selection procedure shall be performed as follows:
If ra-PreambleIndex (Random Access Preamble) and ra-PRACH-Maskindex (PRACH Mask Index) have been explicitly signalled and ra-PreambleIndex is not 000000:
the Random Access Preamble and the PRACH Mask Index are those explicitly signalled.

else the Random Access Preamble shall be selected by the MAC entity as follows:
   If Msg3 has not yet been transmitted, the MAC entity shall:
      if Random Access Preambles group B exists and if the potential message size (UL data available for transmission plus MAC header and, where required, MAC control elements) is greater than messageSizeGroupA and if the pathloss is less than $P_{CMAX,c}$ (of the Serving Cell performing the Random Access Procedure)—preambleInitialReceivedTargetPower—deltaPreambleMsg3—messagePowerOffsetGroupB, then:
         select the Random Access Preambles group B;
      else:
         select the Random Access Preambles group A.
   else, if Msg3 is being retransmitted, the MAC entity shall:
      select the same group of Random Access Preambles as was used for the preamble transmission attempt corresponding to the first transmission of Msg3.
   randomly select a Random Access Preamble within the selected group. The random function shall be such that each of the allowed selections can be chosen with equal probability;
   set PRACH Mask Index to 0.
determine the next available subframe containing PRACH permitted by the restrictions given by the prach-Configindex, the PRACH Mask Index (see subclause 7.3) and physical layer timing requirements [2] (a MAC entity may take into account the possible occurrence of measurement gaps when determining the next available PRACH subframe);
if the transmission mode is TDD and the PRACH Mask Index is equal to zero:
   if ra-Preambleindex was explicitly signalled and it was not 000000 (i.e., not selected by MAC):
      randomly select, with equal probability, one PRACH from the PRACHs available in the determined subframe.
   else:
      randomly select, with equal probability, one PRACH from the PRACHs available in the determined subframe and the next two consecutive subframes.
else:
   determine a PRACH within the determined subframe in accordance with the requirements of the PRACH Mask Index.
proceed to the transmission of the Random Access Preamble (see subclause 5.1.3).

5.1.3 Random Access Preamble Transmission

The random-access procedure shall be performed as follows:
set PREAMBLE_RECEIVED_TARGET_POWER to preambleInitialReceivedTargetPower+DELTA_PREAMBLE+(PREAMBLE_TRANSMISSION_COUNTER−1)*powerRampingStep;
instruct the physical layer to transmit a preamble using the selected PRACH, corresponding RA-RNTI, preamble index and PREAMBLE_RECEIVED_TARGET_POWER.

5.1.4 Random Access Response Reception

Once the Random Access Preamble is transmitted and regardless of the possible occurrence of a measurement gap, the MAC entity shall monitor the PDCCH of the SpCell for Random Access Response(s) identified by the RA-RNTI defined below, in the RA Response window which starts at the subframe that contains the end of the preamble transmission [7] plus three subframes and has length ra-ResponseWindowSize subframes. The RA-RNTI associated with the PRACH in which the Random Access Preamble is transmitted, is computed as:

$$RA\text{-}RNTI = 1 + t\_id + 10 * f\_id$$

Where t_id is the index of the first subframe of the specified PRACH ($0 \leq t\_id < 10$), and f_id is the index of the specified PRACH within that subframe, in ascending order of frequency domain ($0 \leq f\_id < 6$). The MAC entity may stop monitoring for Random Access Response(s) after successful reception of a Random Access Response containing Random Access Preamble identifiers that matches the transmitted Random Access Preamble.

If a downlink assignment for this TTI has been received on the PDCCH for the RA-RNTI and the received TB is successfully decoded, the MAC entity shall regardless of the possible occurrence of a measurement gap:
   if the Random Access Response contains a Backoff Indicator subheader:
      set the backoff parameter value as indicated by the BI field of the Backoff Indicator subheader and Table 7.2-1.
   else, set the backoff parameter value to 0 ms.
   if the Random Access Response contains a Random Access Preamble identifier corresponding to the transmitted Random Access Preamble (see subclause 5.1.3), the MAC entity shall:
      consider this Random Access Response reception successful and apply the following actions for the serving cell where the Random Access Preamble was transmitted:
         process the received Timing Advance Command (see subclause 5.2);
         indicate the preambleInitialReceivedTargetPower and the amount of power ramping applied to the latest preamble transmission to lower layers (i.e., (PREAMBLE_TRANSMISSION_COUNTER−1)*powerRampingStep);
         process the received UL grant value and indicate it to the lower layers;
         if ra-Preambleindex was explicitly signalled and it was not 000000 (i.e., not selected by MAC):
            consider the Random Access procedure successfully completed.
         else, if the Random Access Preamble was selected by the MAC entity:
            set the Temporary C-RNTI to the value received in the Random Access Response message no later than at the time of the first transmission corresponding to the UL grant provided in the Random Access Response message;
            if this is the first successfully received Random Access Response within this Random Access procedure:
               if the transmission is not being made for the CCCH logical channel, indicate to the Multiplexing and assembly entity to include a C-RNTI MAC control element in the subsequent uplink transmission;
               obtain the MAC PDU to transmit from the "Multiplexing and assembly" entity and store it in the Msg3 buffer.

NOTE: When an uplink transmission is required, e.g., for contention resolution, the eNB should not provide a grant smaller than 56 bits in the Random Access Response.

NOTE: If within a Random Access procedure, an uplink grant provided in the Random Access Response for the same group of Random Access Preambles has a different size than the first uplink grant allocated during that Random Access procedure, the UE behavior is not defined.

If no Random Access Response is received within the RA Response window, or if none of all received Random Access Responses contains a Random Access Preamble identifier corresponding to the transmitted Random Access Preamble, the Random Access Response reception is considered not successful and the MAC entity shall:

if the notification of power ramping suspension has not been received from lower layers:
    increment PREAMBLE_TRANSMISSION_COUNTER by 1;
  If PREAMBLE_TRANSMISSION_COUNTER= preambleTransMax+1:
    if the Random Access Preamble is transmitted on the SpCell:
      indicate a Random Access problem to upper layers;
    if the Random Access Preamble is transmitted on an SCell:
      consider the Random Access procedure unsuccessfully completed.
  if in this Random Access procedure, the Random Access Preamble was selected by MAC:
    based on the backoff parameter, select a random backoff time according to a uniform distribution between 0 and the Backoff Parameter Value;
    delay the subsequent Random Access transmission by the backoff time;
  proceed to the selection of a Random Access Resource (see subclause 5.1.2).

5.1.5 Contention Resolution

Contention Resolution is based on either C-RNTI on PDCCH of the SpCell or UE Contention Resolution Identity on DL-SCH.

Once Msg3 is transmitted, the MAC entity shall:
  start mac-ContentionResolutionTimer and restart mac-ContentionResolutionTimer at each HARQ retransmission;
  regardless of the possible occurrence of a measurement gap, monitor the PDCCH until mac-ContentionResolutionTimer expires or is stopped;
  if notification of a reception of a PDCCH transmission is received from lower layers, the MAC entity shall:
    if the C-RNTI MAC control element was included in Msg3:
      if the Random Access procedure was initiated by the MAC sublayer itself or by the RRC sublayer and the PDCCH transmission is addressed to the C-RNTI and contains an UL grant for a new transmission; or
      if the Random Access procedure was initiated by a PDCCH order and the PDCCH transmission is addressed to the C-RNTI:
        consider this Contention Resolution successful;
        stop mac-ContentionResolutionTimer;
        discard the Temporary C-RNTI;
        consider this Random Access procedure successfully completed.
    else if the CCCH SDU was included in Msg3 and the PDCCH transmission is addressed to its Temporary C-RNTI:
      if the MAC PDU is successfully decoded:
        stop mac-ContentionResolutionTimer;
        if the MAC PDU contains a UE Contention Resolution Identity MAC control element; and
        if the UE Contention Resolution Identity included in the MAC control element matches the CCCH SDU transmitted in Msg3:
          consider this Contention Resolution successful and finish the disassembly and demultiplexing of the MAC PDU;
          set the C-RNTI to the value of the Temporary C-RNTI;
          discard the Temporary C-RNTI;
          consider this Random Access procedure successfully completed.
        else
        discard the Temporary C-RNTI;
        consider this Contention Resolution not successful and discard the successfully decoded MAC PDU.
  if mac-ContentionResolutionTimer expires:
    discard the Temporary C-RNTI;
    consider the Contention Resolution not successful.
  if the Contention Resolution is considered not successful the MAC entity shall:
    flush the HARQ buffer used for transmission of the MAC PDU in the Msg3 buffer;
    if the notification of power ramping suspension has not been received from lower layers:
      increment PREAMBLE_TRANSMISSION_COUNTER by 1;
    If PREAMBLE_TRANSMISSION_COUNTER= preambleTransMax+1:
      indicate a Random Access problem to upper layers.
    based on the backoff parameter, select a random backoff time according to a uniform distribution between 0 and the Backoff Parameter Value;
    delay the subsequent Random Access transmission by the backoff time;
    proceed to the selection of a Random Access Resource (see subclause 5.1.2).

5.1.6 Completion of the Random Access Procedure

At completion of the Random Access procedure, the MAC entity shall:
  discard explicitly signalled ra-Preambleindex and ra-PRACH-Maskindex, if any;
  flush the HARQ buffer used for transmission of the MAC PDU in the Msg3 buffer.

In addition, the RN shall resume the suspended RN subframe configuration, if any.

6.1.3.4 UE Contention Resolution Identity MAC Control Element

The UE Contention Resolution Identity MAC control element is identified by MAC PDU subheader with LCID as specified in table 6.2.1-1. This control element has a fixed 48-bit size and consists of a single field defined as follows (Figure 6.1.3.4-1)

UE Contention Resolution Identity: This field contains the uplink CCCH SDU.

Figure 5:
FIG. 5 is a reproduction of Figure 6.1.3.4-1 of 3GPP TS 36.321 V12.7.0.
Figure 6:
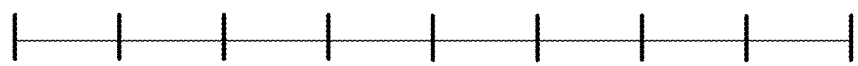
FIG. 6 is a reproduction of Figure 6.1.5-1 of 3GPP TS 36.321 V12.7.0.

[Figure 6.1.3.4-1 of 3GPP TS 36.321 V12.7.0, entitled "UE Contention Resolution Identity MAC control element", is reproduced as FIG. 5]

6.1.5 MAC PDU (Random Access Response)

A MAC PDU consists of a MAC header and zero or more MAC Random Access Responses (MAC RAR) and optionally padding as described in Figure 6.1.5-4.

The MAC header is of variable size.

A MAC PDU header consists of one or more MAC PDU subheaders; each subheader corresponding to a MAC RAR except for the Backoff Indicator subheader. If included, the Backoff Indicator subheader is only included once and is the first subheader included within the MAC PDU header.

A MAC PDU subheader consists of the three header fields E/T/RAPID (as described in Figure 6.1.5-1) but for the Backoff Indicator subheader which consists of the five header field E/T/R/R/BI (as described in Figure 6.1.5-2).

A MAC RAR consists of the four fields R/Timing Advance Command/UL Grant/Temporary C-RNTI (as described in Figure 6.1.5-3).

Padding may occur after the last MAC RAR. Presence and length of padding is implicit based on TB size, size of MAC header and number of RARs.

[Figure 6.1.5-1 of 3GPP TS 36.321 V12.7.0, entitled "E/T/RAPID MAC subheader", is reproduced as FIG. 6]

Figure 7:
FIG. 7 is a reproduction of Figure 6.1.5-2 of 3GPP TS 36.321 V12.7.0.

[Figure 6.1.5-2 of 3GPP TS 36.321 V12.7.0, entitled "E/T/R/R/BI MAC subheader", is reproduced as FIG. 7]

Figure 8:
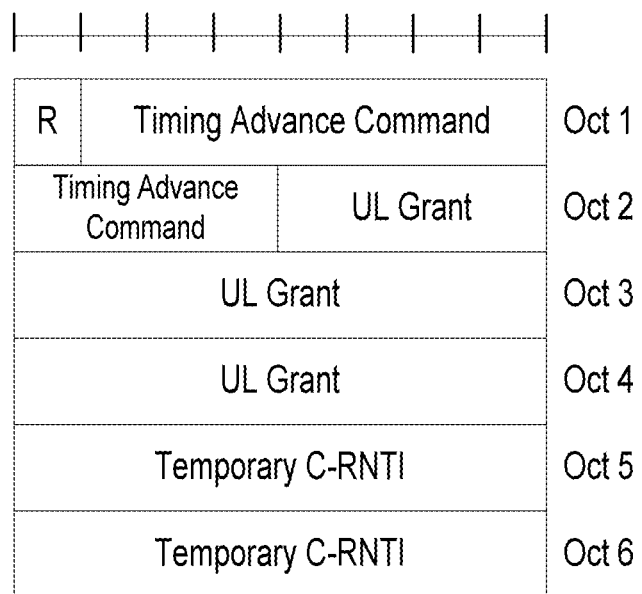
FIG. 8 is a reproduction of Figure 6.1.5-3 of 3GPP TS 36.321 V12.7.0.

[Figure 6.1.5-3 of 3GPP TS 36.321 V12.7.0, entitled "MAC RAR", is reproduced as FIG. 8]

Figure 9:
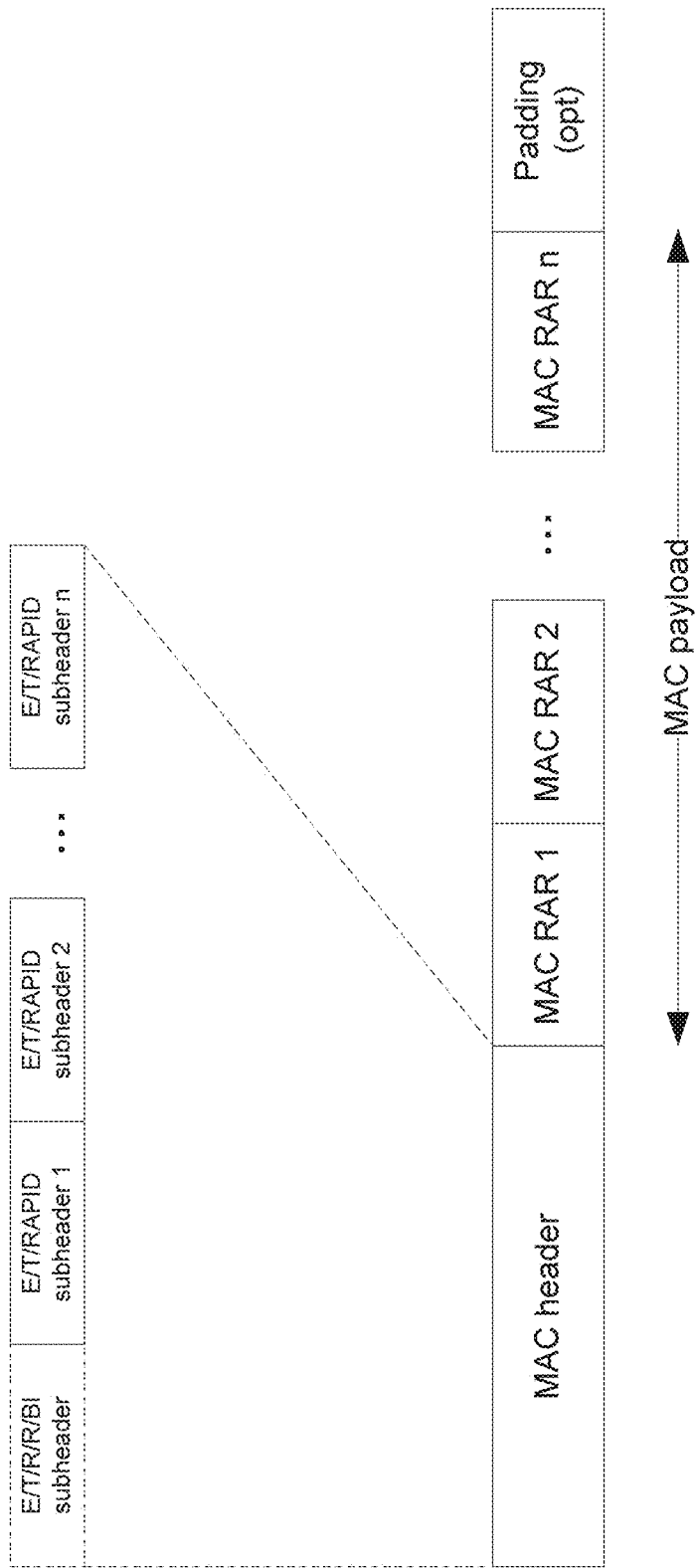
FIG. 9 is a reproduction of Figure 6.1.5-4 of 3GPP TS 36.321 V12.7.0.

[Figure 6.1.5-4 of 3GPP TS 36.321 V12.7.0, entitled "Example of MAC PDU consisting of a MAC header and MAC RARs", is reproduced as FIG. 9]

6.2.2 MAC header for Random Access Response

The MAC header is of variable size and consists of the following fields:
- E: The Extension field is a flag indicating if more fields are present in the MAC header or not. The E field is set to "1" to indicate at least another set of E/T/RAPID fields follows. The E field is set to "0" to indicate that a MAC RAR or padding starts at the next byte;
- T: The Type field is a flag indicating whether the MAC subheader contains a Random Access ID or a Backoff Indicator. The T field is set to "0" to indicate the presence of a Backoff Indicator field in the subheader (BI). The T field is set to "1" to indicate the presence of a Random Access Preamble ID field in the subheader (RAPID);
- R: Reserved bit, set to "0";
- BI: The Backoff Indicator field identifies the overload condition in the cell. The size of the BI field is 4 bits;
- RAPID: The Random Access Preamble IDentiftier field identifies the transmitted Random Access Preamble (see subclause 5.1.3). The size of the RAPID field is 6 bits.

The MAC header and subheaders are octet aligned.

6.2.3 MAC Payload for Random Access Response

The MAC RAR is of fixed size and consists of the following fields:
- R: Reserved bit, set to "0";
- Timing Advance Command: The Timing Advance Command field indicates the index value $T_A$ (0, 1, 2 ... 1282) used to control the amount of timing adjustment that the MAC entity has to apply (see subclause 4.2.3 of [2]). The size of the Timing Advance Command field is 11 bits;
- UL Grant: The UpLink Grant field indicates the resources to be used on the uplink (see subclause 6.2 of [2]). The size of the UL Grant field is 20 bits;
- Temporary C-RNTI: The Temporary C-RNTI field indicates the temporary identity that is used by the MAC entity during Random Access. The size of the Temporary C-RNTI field is 16 bits.

The MAC RAR is octet aligned.

As discussed in 3GPP TS 36.321 above, after successful reception of a Random Access Response for the preamble not selected by the UE, the Random Access procedure is considered successfully complete. Since the contention free random access procedure is triggered by the network, it can be expected that after the random access procedure there will be one or more UL (Uplink) or DL (Downlink) transmission indication from the network. Thus, the UE needs to monitor PDCCH (Physical Downlink Control Channel) after successful reception of the Random Access Response. Such principle is included in the discontinuous reception (DRX) procedure, which is described in the LTE MAC specification (3GPP TS 36.321) as follows:

5.7 Discontinuous Reception (DRX)

The MAC entity may be configured by RRC with a DRX functionality that controls the UE's PDCCH monitoring activity for the MAC entity's C-RNTI, TPC-PUCCH-RNTI, TPC-PUSCH-RNTI, Semi-Persistent Scheduling C-RNTI (if configured), eIMTA-RNTI (if configured) and SL-RNTI (if configured). When in RRC_CONNECTED, if DRX is configured, the MAC entity is allowed to monitor the PDCCH discontinuously using the DRX operation specified in this subclause; otherwise the MAC entity monitors the PDCCH continuously. When using DRX operation, the MAC entity shall also monitor PDCCH according to requirements found in other subclauses of this specification. RRC controls DRX operation by configuring the timers onDurationTimer, drx-InactivityTimer, drx-Retransmission Timer (one per DL HARQ process except for the broadcast process), the longDRX-Cycle, the value of the drxStartOffset and optionally the drxShortCycleTimer and shortDRX-Cycle. A HARQ RTT timer per DL HARQ process (except for the broadcast process) is also defined (see subclause 7.7).

When a DRX cycle is configured, the Active Time includes the time while:
- onDurationTimer or drx-InactivityTimer or drx-RetransmissionTimer or mac-ContentionResolutionTimer (as described in subclause 5.1.5) is running; or
- a Scheduling Request is sent on PUCCH and is pending (as described in subclause 5.4.4); or
- an uplink grant for a pending HARQ retransmission can occur and there is data in the corresponding HARQ buffer; or
- a PDCCH indicating a new transmission addressed to the C-RNTI of the MAC entity has not been received after successful reception of a Random Access Response for the preamble not selected by the MAC entity (as described in subclause 5.1.4).

When DRX is configured, the MAC entity shall for each subframe:
- if a HARQ RTT Timer expires in this subframe and the data of the corresponding HARQ process was not successfully decoded:
  - start the drx-RetransmissionTimer for the corresponding HARQ process.
- if a DRX Command MAC control element or a Long DRX Command MAC control element is received:
  - stop onDurationTimer;
  - stop drx-InactivityTimer.
- if drx-InactivityTimer expires or a DRX Command MAC control element is received in this subframe:
  - if the Short DRX cycle is configured:
    - start or restart drxShortCycleTimer;
    - use the Short DRX Cycle.
  - else:
    - use the Long DRX cycle.
- if drxShortCycleTimer expires in this subframe:
  - use the Long DRX cycle.
- if a Long DRX Command MAC control element is received:
  - stop drxShortCycleTimer;
  - use the Long DRX cycle.

If the Short DRX Cycle is used and [(SFN*10)+subframe number] modulo (shortDRX-Cycle)=(drxStartOffset) modulo (shortDRX-Cycle); or if the Long DRX Cycle is used and [(SFN*10)+subframe number] modulo (longDRX-Cycle)=drxStartOffset: start onDurationTimer.

during the Active Time, for a PDCCH-subframe, if the subframe is not required for uplink transmission for half-duplex FDD UE operation, if the subframe is not a half-duplex guard subframe [7] and if the subframe is not part of a configured measurement gap; or during the Active Time, for a subframe other than a PDCCH-subframe and for a UE capable of simultaneous reception and transmission in the aggregated cells, if the subframe is a downlink subframe indicated by a valid eIMTA L1 signalling for at least one serving cell not configured with schedulingCellId [8] and if the subframe is not part of a configured measurement gap; or during the Active Time, for a subframe other than a PDCCH-subframe and for a UE not capable of simultaneous reception and transmission in the aggregated cells, if the subframe is a downlink subframe indicated by a valid eIMTA L1 signalling for the SpCell and if the subframe is not part of a configured measurement gap: monitor the PDCCH;
  if the PDCCH indicates a DL transmission or if a DL assignment has been configured for this subframe:
    start the HARQ RTT Timer for the corresponding HARQ process;
    stop the drx-Retransmission Timer for the corresponding HARQ process.
  if the PDCCH indicates a new transmission (DL, UL or SL):
    start or restart drx-InactivityTimer.

in current subframe n, if the MAC entity would not be in Active Time considering grants/assignments/DRX Command MAC control elements/Long DRX Command MAC control elements received and Scheduling Request sent until and including subframe n-5 when evaluating all DRX Active Time conditions as specified in this subclause, type-0-triggered SRS [2] shall not be reported.

if CQI masking (cqi-Mask) is setup by upper layers:
  in current subframe n, if onDurationTimer would not be running considering grants/assignments/DRX Command MAC control elements/Long DRX Command MAC control elements received until and including subframe n-5 when evaluating all DRX Active Time conditions as specified in this subclause, CQI/PMI/RI/PTI on PUCCH shall not be reported.

else:
  in current subframe n, if the MAC entity would not be in Active Time considering grants/assignments/DRX Command MAC control elements/Long DRX Command MAC control elements received and Scheduling Request sent until and including subframe n-5 when evaluating all DRX Active Time conditions as specified in this subclause, CQI/PMI/RI/PTI on PUCCH shall not be reported.

Regardless of whether the MAC entity is monitoring PDCCH or not, the MAC entity receives and transmits HARQ feedback and transmits type-1-triggered SRS [2] when such is expected.

NOTE: The same Active Time applies to all activated serving cell(s).

NOTE: In case of downlink spatial multiplexing, if a TB is received while the HARQ RTT Timer is running and the previous transmission of the same TB was received at least N subframes before the current subframe (where N corresponds to the HARQ RTT Timer), the MAC entity should process it and restart the HARQ RTT Timer.

3GPP standardization activities on next generation (i.e., 5G) access technology have been launched since March 2015. The next generation access technology aims to support the following three families of usage scenarios (as discussed in 3GPP TR 38.913) for satisfying both the urgent market needs and the more long-term requirements set forth by the ITU-R IMT-2020:

eMBB (enhanced Mobile Broadband)

mMTC (massive Machine Type Communications)

URLLC (Ultra-Reliable and Low Latency Communications).

In addition, several key performance indicators of NR are specified in 3GPP TR 38.913. For example:

The target for control plane latency should be 10 ms.

Control plane latency refers to the time to move from a battery efficient state (e.g., IDLE) to start of continuous data transfer (e.g., ACTIVE).

For eMBB, the target for user plane latency should be 4 ms for UL, and 4 ms for DL. For URLLC the target for user plane latency should be 0.5 ms for UL, and 0.5 ms for DL.

The time it takes to successfully deliver an application layer packet/message from the radio protocol layer 2/3 SDU ingress point to the radio protocol layer 2/3 SDU egress point via the radio interface in both uplink and downlink directions, where neither device nor Base Station reception is restricted by DRX.

The latency for infrequent small packets shall be no worse than 10 seconds on the uplink for a 20 byte application packet (with uncompressed IP header corresponding to 105 bytes physical layer) measured at the maximum coupling loss (MaxCL) of 164 dB.

For infrequent application layer small packet/message transfer, the time it takes to successfully deliver an application layer packet/message from the radio protocol layer 2/3 SDU ingress point at the mobile device to the radio protocol layer 2/3 SDU egress point in the RAN, when the mobile device starts from its most "battery efficient" state.

The target for mobility interruption time should be 0 ms.

Mobility interruption time means the shortest time duration supported by the system during which a user terminal cannot exchange user plane packets with any base station during transitions. This KPI is for both intra-frequency and inter-frequency mobility for intra-NR mobility.

Agreement of 3GPP RAN1 #86bis meeting with respect to data and control information is described in the RAN1 #86bis meeting minutes as follows:

NR should support both data and control with the same numerology

Study impact and benefits of allowing the transmission of DL control information and data transmission to a UE within the same slot interval using different numerologies in TDM or FDM manner Above may apply both slot and mini-slot Study impact and benefits of allowing the transmission of uplink control information and data transmission from a UE within the same slot interval using different numerologies in TDM or FDM manner Above may apply both slot and mini-slot Followings applies both DL and UL The associated DM-RS for data/control transmission still uses the same numerology as the data/control transmission FFS: Control channel performance under different numerologies, Overhead saving, Control channel capacity; Quantify timeline saving, UE complexity Agreement of 3GPP RAN2 #96 meeting with respect to DRX is described in the RAN2 #96 meeting minutes as follows:

1. DRX enhancement is studied in NR in order to support multiple services with different requirements and/or numerologies.

Agreement of 3GPP RAN2 AdHoc meeting on NR with respect to Services/Numerologies is described in the RAN2 AdHoc meeting on NR as follows:

1: a single logical channel can be mapped to one or more numerology/TTI duration.
2: ARQ can be performed on any numerologies/TTI lengths that the LCH is mapped to.
3: The RLC configuration is per logical channel without dependency on numerology/TTI length.
4: Logical channel to numerology/TTI length mapping can be reconfigured via RRC reconfiguration.
5: RAN2 will leave RAN1 to decide whether HARQ retransmission can be performed across different numerologies and/or TTI durations.
6: wait for more details from RAN1 to decide whether HARQ configuration, if any, needs to be numerology/TTI duration specific.
7: a single MAC entity can support one or more numerology/TTI durations.
8: LCP takes into account the mapping of logical channel to one or more numerology/TTI duration. Details of LCP will be discussed in the WI phase Agreement of 3GPP RAN2 #97 meeting with respect to sTTI is described in the RAN2 #97 meeting minutes as follows:

Logical channel can be configured to use to one or more TTI duration(s).
The mapping of LCH to TTI duration(s) is configured by RRC
Legacy LCP applies among considered logical channels for RBs. FFS how MAC CEs will be handled.
From the MAC perspective, the physical layer indicate should indicate the associated TTI duration for the UL grant
A single MAC entity will support both legacy and short TTIs
Common DRX configuration per MAC entity is applied. Enhancements for sTTI sPDCCH monitoring can be considered.

Agreement of 3GPP RAN2 #97bis meeting with respect to sTTI (short Transmission Time Interval) is described in the RAN2 #97bis meeting minutes as follows:

1. The unit for drx-RetransmissionTimer, drx-ULRetransmissionTimer counting is same as the HARQ RTT time expiry that starts the retransmission time, i.e. depending on the TTI length of the TB that is under retransmission.
2. Legacy DRX Cycle and drxShortCycleTimer are in number of subframes regardless of which TTI length is used.
3. Legacy onDurationTimer and drx-InactivityTimer counts number of PDCCH-subframes regardless of which TTI length is used.
4. Whether additional enhancements for sPDCCH monitoring are needed is FFS. Whether additional timers for sPDCCH enhancements is need is FFS.

Agreement of 3GPP RAN2 #97bis meeting with respect to DRX is described in the RAN2 #97bis meeting minutes as follows:

A MAC entity can be in one DRX state (i.e. single on/off time) at any given time. FFS if multiple configuration are supported.
When MAC entity is awake it monitors "PDCCH" occasion
In NR, a DRX configuration is described by at least the following configuration parameters: an on duration time, an inactivity time, a retransmission time, short DRX cycles, long DRX cycles Definitions of numerology and TTI duration as well as related agreements are discussed in 3GPP TR 38.804 as follows:

5.4.7 Numerologies and TTI Durations

One numerology corresponds to one subcarrier spacing in the frequency domain. By scaling a basic subcarrier spacing by an integer N, different numerologies can be defined in TR 38.802 [14].

One TTI duration corresponds to a number of consecutive symbols in the time domain in one transmission direction. Different TTI durations can be defined when using different number of symbols (e.g. corresponding to a mini-slot, one slot or several slots in one transmission direction).

The combination of one numerology and one TTI duration determines how transmission is to be made on the physical layer.

Which numerologies and/or TTI durations a logical channel of a radio bearer is mapped to can be configured and reconfigured via RRC signalling. The mapping is not visible to RLC, i.e. the RLC configuration is per logical channel with no dependency on numerologies and/or TTI durations, and ARQ can operate on any of the numerologies and/or TTI durations the logical channel is configured with.

A single MAC entity can support one or multiple numerologies and/or TTI durations but in order for the mapping to be respected, logical channel prioritization procedure takes into account the mapping of one LCH to one or more numerologies and/or TTI durations.

NOTE: HARQ operation with multiple numerologies and TTI durations is FFS, and it should be discussed and decided by RAN1.

NOTE: Whether any characteristic of the numerology beyond the TTI is visible to MAC is FFS (depending on progress in RAN1).

Figure 10:
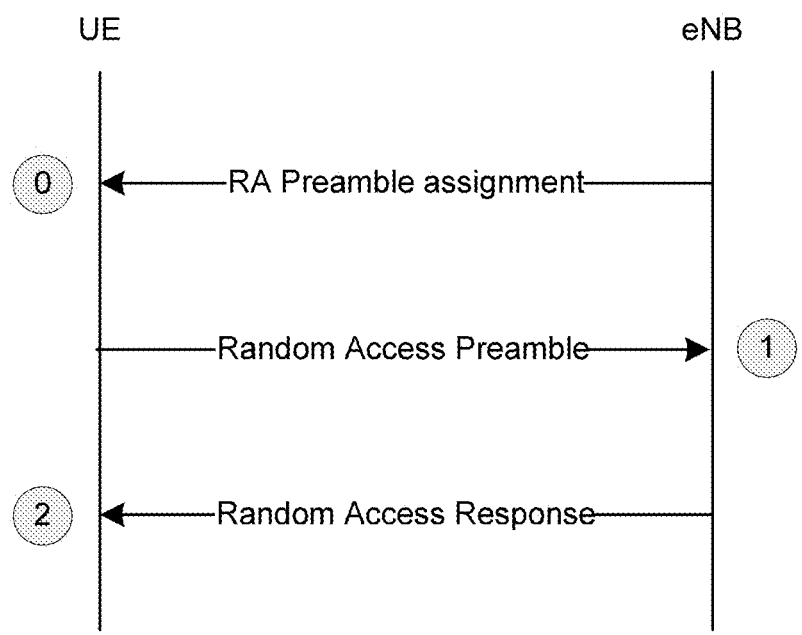
FIG. 10 is a diagram according to one exemplary embodiment.

The Random Access procedure with the preamble not selected by the UE is the non-contention based Random Access procedure, as shown in FIG. 10. The non-contention based Random Access procedure may be triggered by events including: (1) Handover, (2) DL data arrival (when UL is not synchronized), (3) Positioning (when timing advance is needed for UE positioning), (4) initial UL time alignment for a sTAG, and/or other cases. The three steps of the non-contention based Random Access procedure are Msg0 (e.g., PDCCH order and/or Handover Command), Msg1 (e.g., RA preamble), and Msg2 (e.g., Random Access Response).

After successful reception of a Random Access Response (RAR), the UE apply the Timing Advance (TA) Command included in the RAR.

Figure 11:
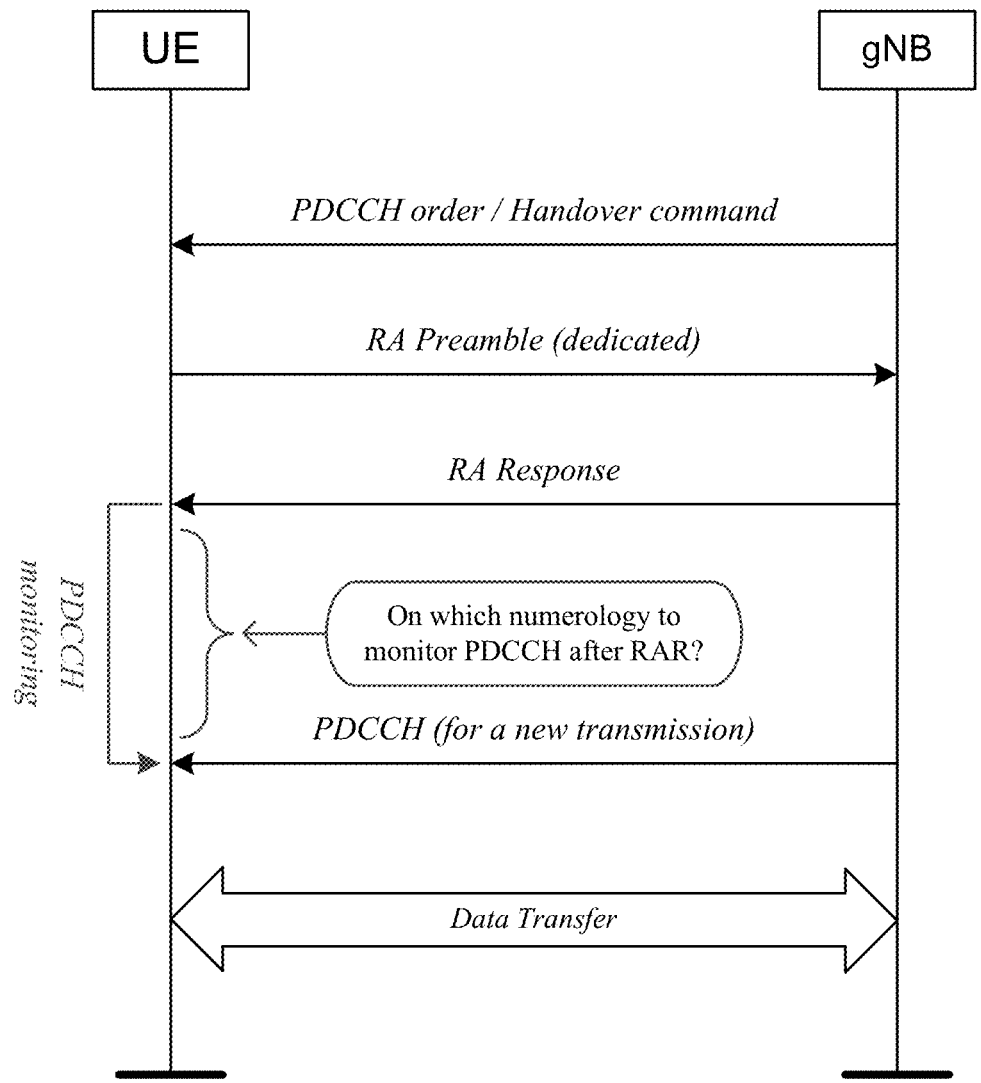
FIG. 11 is a diagram according to one exemplary embodiment.

There are many different cases that the UE needs to monitor the control channel (e.g., NR-PDCCH) for receiving the scheduling information of data transmission (UL and/or DL). As described in the background, one case is that UE needs to monitor the control channel after successful reception of a Random Access Response for the preamble not selected by the UE until a PDCCH indicating a new transmission addressed to the C-RNTI of the UE is received in LTE system. As described above, multiple numerologies are supported in NR (i.e., 5G). In this situation, which numerology a UE needs to monitor to receive the control channel for the scheduling information after successful reception of a Random Access Response for the preamble not selected by the UE should be considered as shown in FIG. 11.

In a LTE system, because there is only single numerology, the UE monitors only one numerology to receive the control channel (e.g., PDCCH) for the scheduling information. However, in NR system, there can be multiple numerologies. Therefore, the UE may need to monitor all the numerologies on which the control channel may exist. In case of DL data arrival or handover, data transmission occurs only on the numerology to which the arrival data is mapped. In this situation, monitoring all numerologies will consume extra UE power unnecessarily. As a result, it is beneficial for the UE to know on which numerology it needs to monitor for the control channel.

Figure 12:
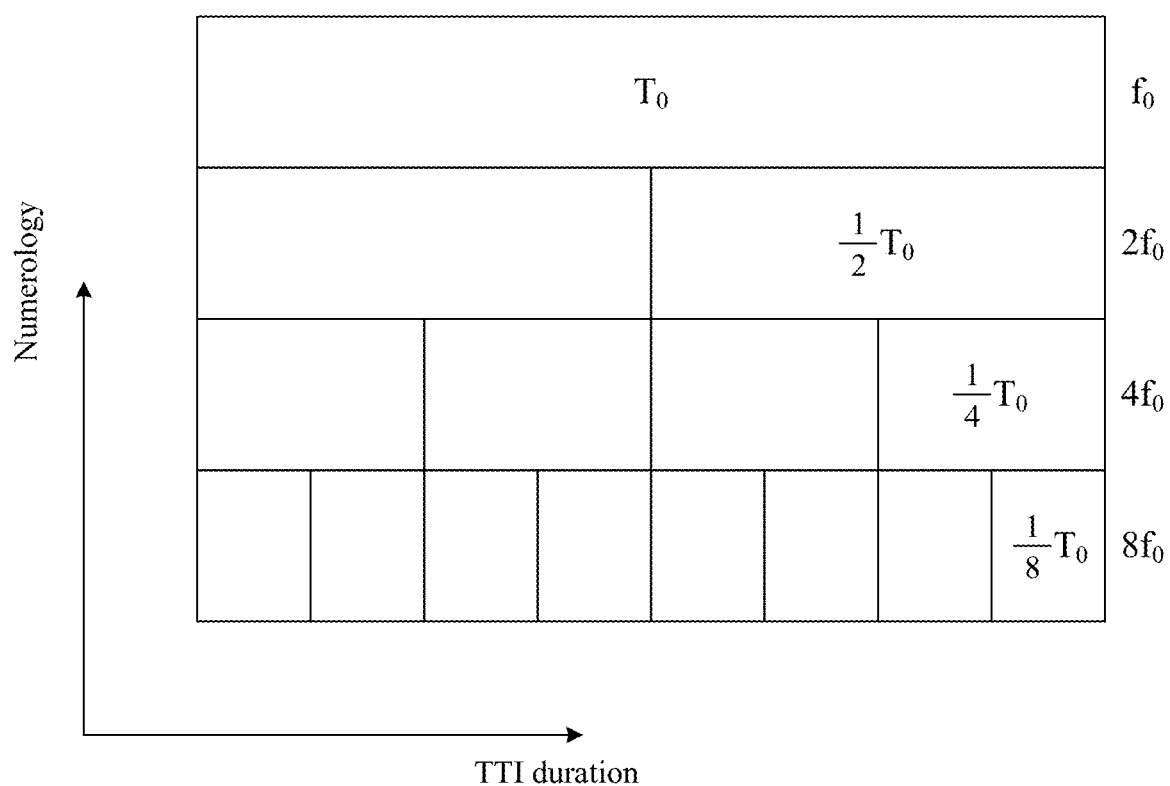
FIG. 12 is a diagram according to one exemplary embodiment.
Figure 13:
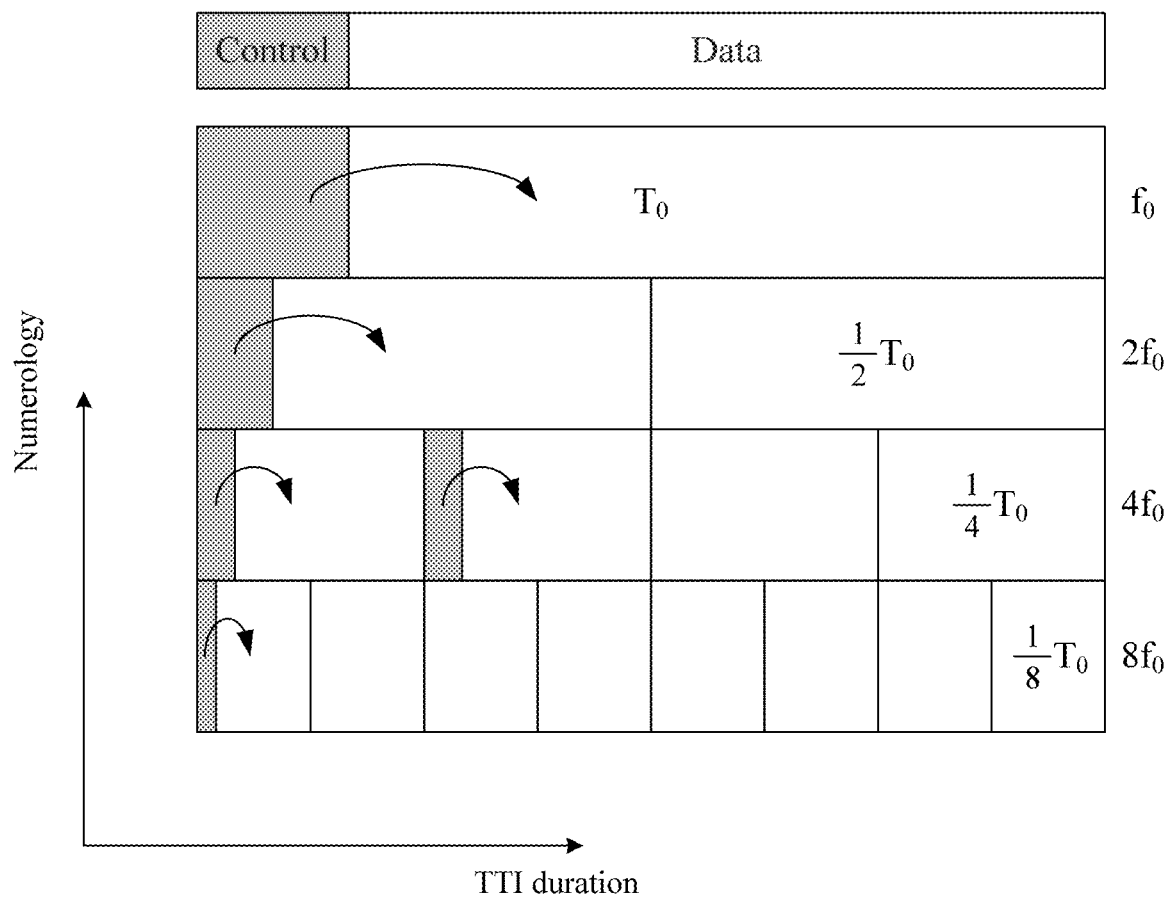
FIG. 13 is a diagram according to one exemplary embodiment.
Figure 14:
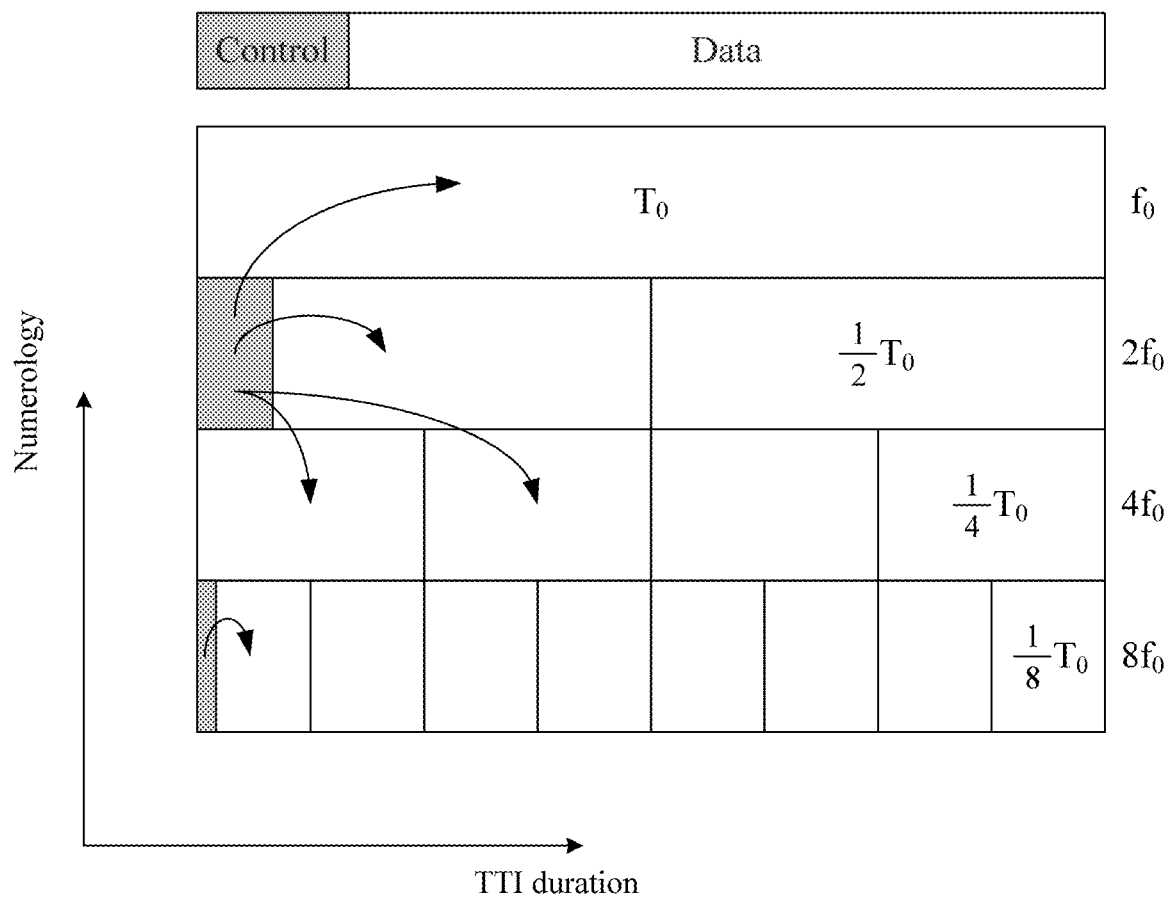
FIG. 14 is a diagram according to one exemplary embodiment.

Based on the "Observation 1" in 3GPP R1-1704193, different numerologies for data channel and control channel potentially increases UE complexity. It is assumed that there can be multiple numerologies for NR-PDCCH, as shown in FIG. 12; and same numerology or different numerologies for control and data could be considered. In other words, for the relationship between control channel and data channel, same numerology scheduling and cross numerology scheduling both can exist, as shown in FIG. 13 and FIG. 14.

Based on the discussion in 3GPP R2-1702599, since different numerologies support different PRACH configurations is agreed by RAN1, it is preferable to perform the RACH procedure (i.e., random access procedure) on the numerology where the actual data transmission will be performed because the TA obtained via RACH procedure on one numerology may not be accurate enough for data transmission on other numerologies. Since the Msg0 of the non-contention based Random Access procedure informs the UE about how to transmit the Msg1, the information of on which numerology for Msg1 transmission may be included.

Figure 15:
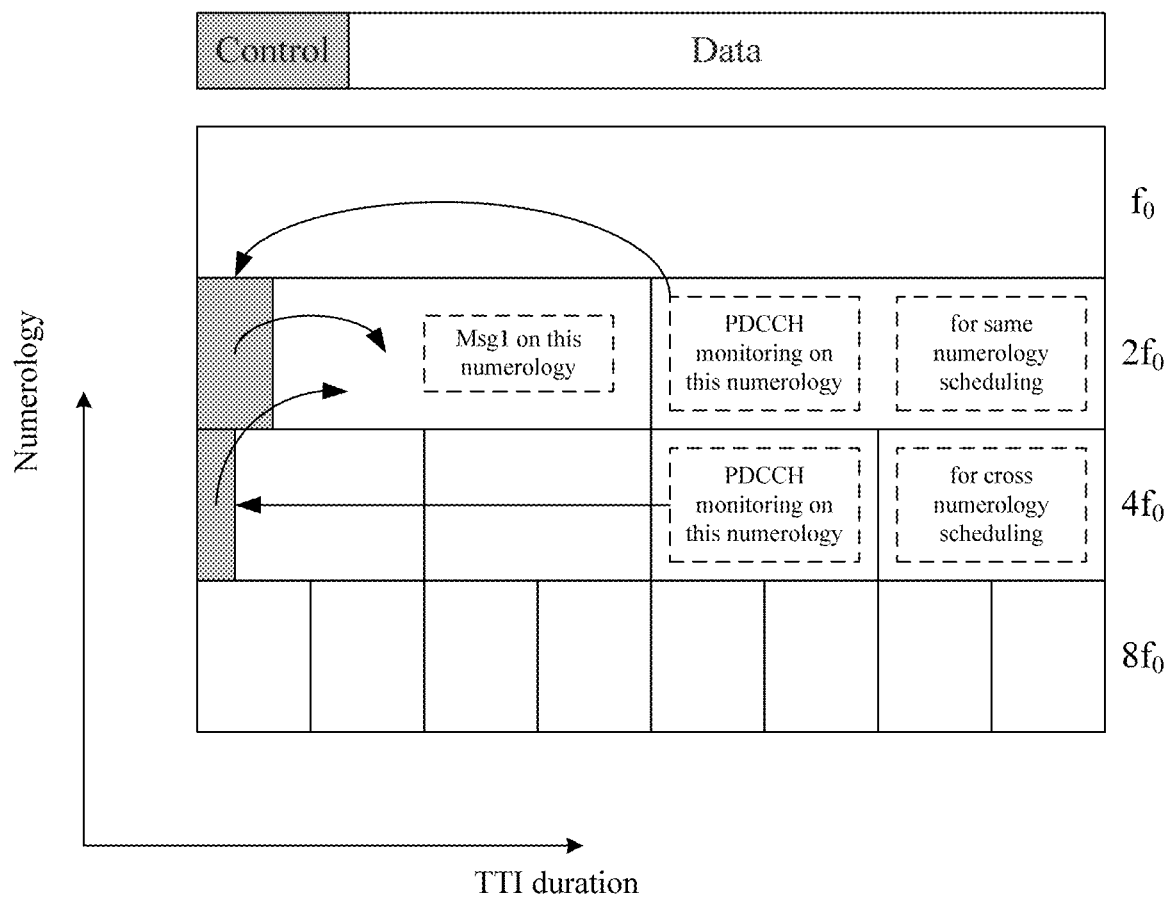
FIG. 15 is a diagram according to one exemplary embodiment.

As a solution, the UE may take this implicit indication in Msg0 (i.e., information of the numerology for Msg1 transmission) for knowing the numerology the UE should monitor for NR-PDCCH after reception of a Random Access Response. More specifically, in case of same numerology scheduling, the UE monitor NR-PDCCH on the numerology used for Msg1 transmission since the control channel and the data transmission exist on the same numerology. Furthermore, in case of cross numerology scheduling, the UE monitor the possible (one or more) numerology on which the control channel can exist to schedule the data transmission on the numerology for Msg1 transmission. The UE may know the possible (one or more) numerology on which the control channel can exist to schedule the data transmission on the specific numerology via the configuration signaling from network or certain rule defined in the standards (e.g., a numerology with wider subcarrier spacing can cross-schedule a numerology with narrower subcarrier spacing). An example of the invention is shown in FIG. 15 according to one embodiment.

As another solution, the Msg0 may provide an explicit indication about on which (one or more) numerology the UE should monitor for NR-PDCCH after reception of a Random Access Response for the preamble not selected by the UE. Due to cross numerology scheduling, the (one or more) numerology from the explicit indication in Msg0 may be different from the numerology for Msg1 transmission.

Figure 16:
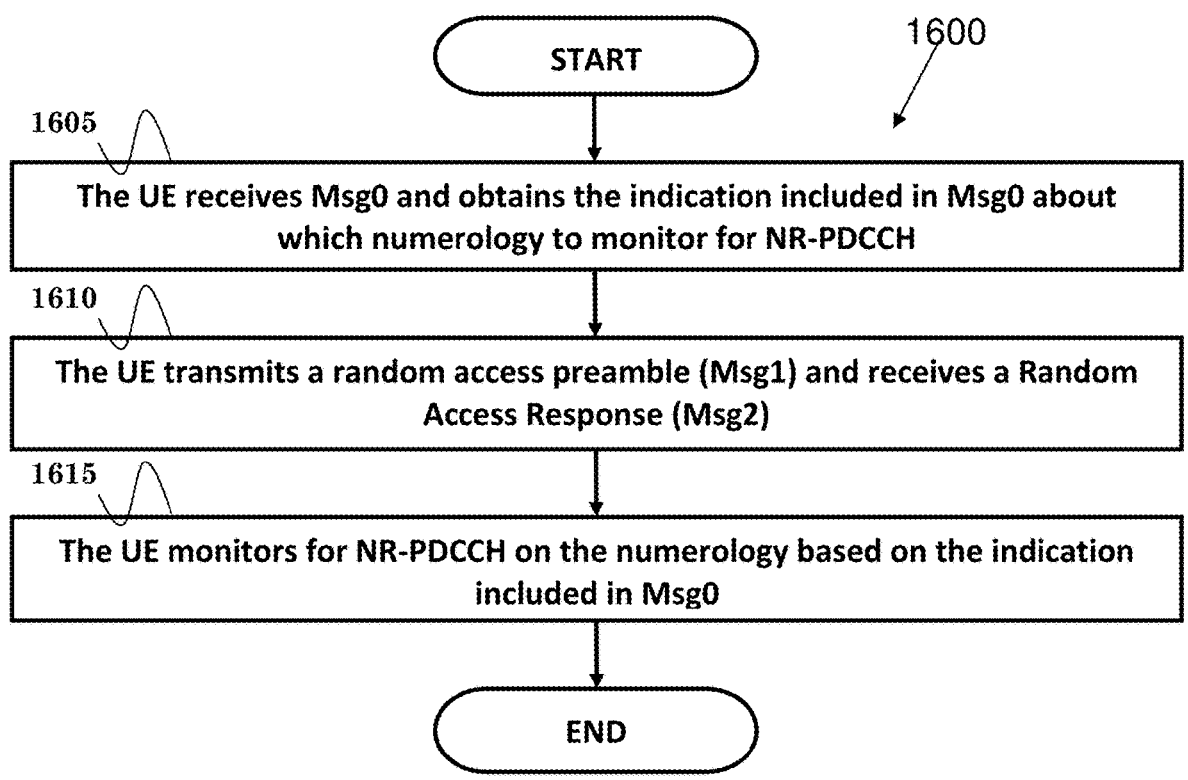
FIG. 16 is a flow chart according to one exemplary embodiment.

FIG. 16 illustrates an example of the invention according to one embodiment of a UE. In step 1605, the UE receives Msg0 and obtains the indication included in Msg0 about which numerology to monitor for NR-PDCCH. In step 1610, the UE transmits a random access preamble (Msg1) and receives a Random Access Response (Msg2). In step 1615, the UE monitors for NR-PDCCH on the numerology based on the indication included in Msg0.

As an additional solution, the indication about on which (one or more) numerology the UE should monitor for NR-PDCCH after reception of a Random Access Response for the preamble not selected by the UE can be provided from network in Msg2 (i.e., RAR). As described above, the MAC RAR of LTE system includes UL grant part and temporary C-RNTI part. More specifically, the indication provided from network in Msg2 can be explicit indication, which may be allocated in a new field or in the temporary C-RNTI field. It is assumed that the temporary C-RNTI field is unused during non-contention based Random Access procedure for LTE system. In case of same numerology scheduling, the UE monitors the numerology indicated in Msg2 since the control channel and the data transmission exist on the same numerology. In case of cross numerology scheduling, the UE monitor all possible numerologies on which the control channel can exist to schedule the data transmission on the numerology indicated in Msg2. The UE may know the possible numerology on which the control channel can exist to schedule the data transmission on the specific numerology through the configuration signaling from network or certain rule defined in the standards (e.g., a numerology with wider subcarrier spacing can cross-schedule a numerology with narrower subcarrier spacing).

Figure 17:
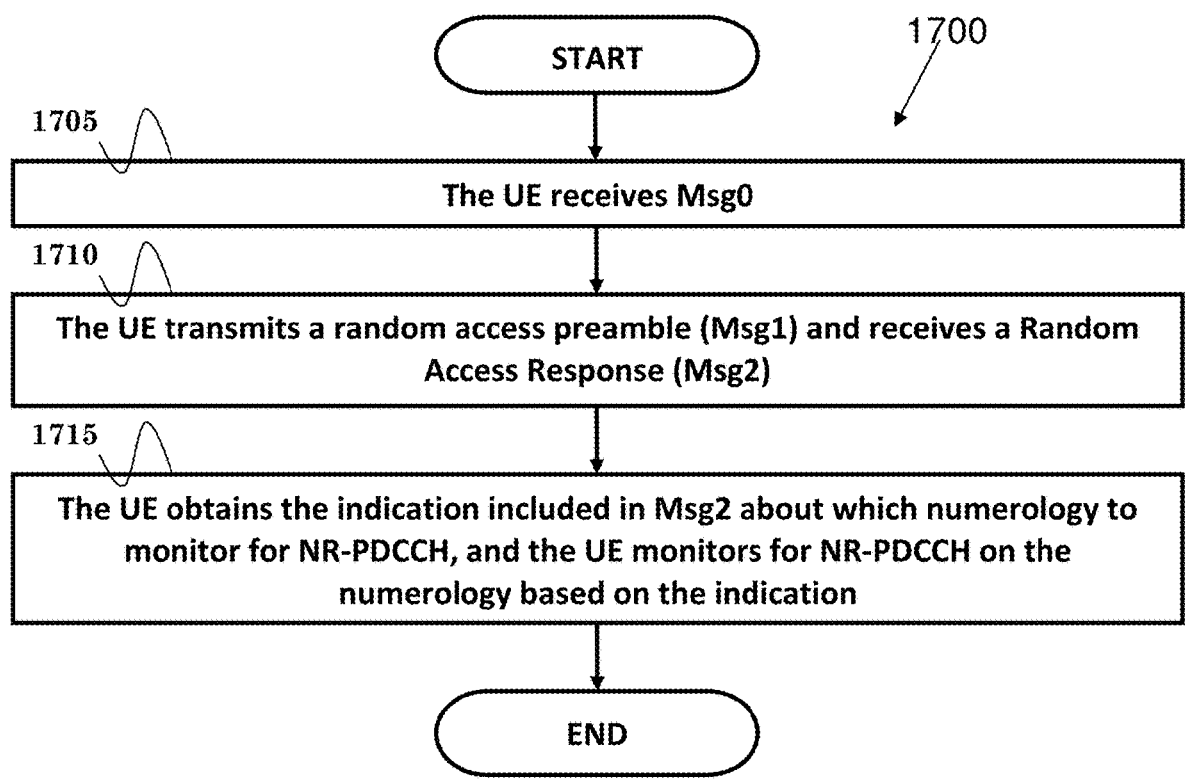
FIG. 17 is a flow chart according to one exemplary embodiment.

FIG. 17 shows an example of the invention according to one embodiment of a UE. In step 1705, the UE receives Msg0. In step 1710, the UE transmits a random access preamble (Msg1) and receives a Random Access Response (Msg2). In step 1715, the UE obtains the indication included in Msg2 about which numerology to monitor for NR-PDCCH, and the UE monitors for NR-PDCCH on the numerology based on the indication.

Figure 18:
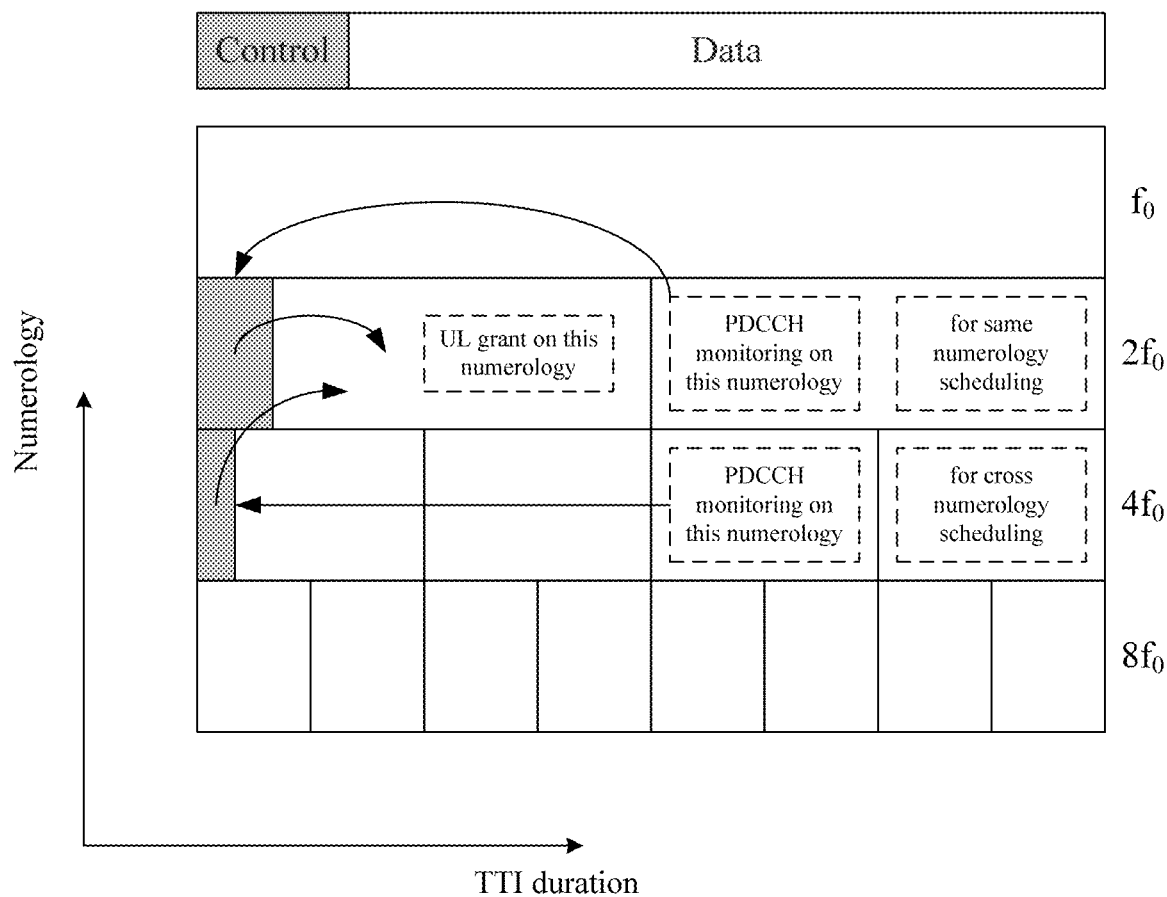
FIG. 18 is a diagram according to one exemplary embodiment.

As an alternative solution, the indication provided from network in Msg2 (i.e., RAR) can be implicit carried by UL grant part. In other words, the numerology of the UL grant in Msg2 can be used for informing the UE about on which (one or more) numerology the UE should monitor for NR-PDCCH after reception of a Random Access Response for the preamble not selected by the UE. More specifically, it may be specified that the numerology of the UL grant is the numerology the UE should monitor for NR-PDCCH. Furthermore, it may be specified that the numerology of the UL grant is the numerology for following data transmission. In case of same numerology scheduling, the UE monitors the numerology of the UL grant since the control channel and the data transmission exist on the same numerology. In case of cross numerology scheduling, the UE monitors all possible numerologies on which the control channel can exist to schedule the data transmission on the numerology of UL grant. The UE may know the possible numerology on which the control channel can exist to schedule the data transmission on the specific numerology through the configuration signaling from network or certain rule defined in the standards (e.g., a numerology with wider subcarrier spacing can cross-schedule a numerology with narrower subcarrier spacing). An example of the invention is shown in FIG. 18 according to one embodiment.

In the above solutions, the numerology for Msg1 transmission may be indicated in Msg0. Other ways for determining the numerology for Msg1 transmission are also possible (e.g., a default numerology broadcast in system information or explicitly defined in the standards). It is also feasible for the UE to select the numerology for Msg1 transmission from multiple numerologies configured to the UE.

Figure 19:
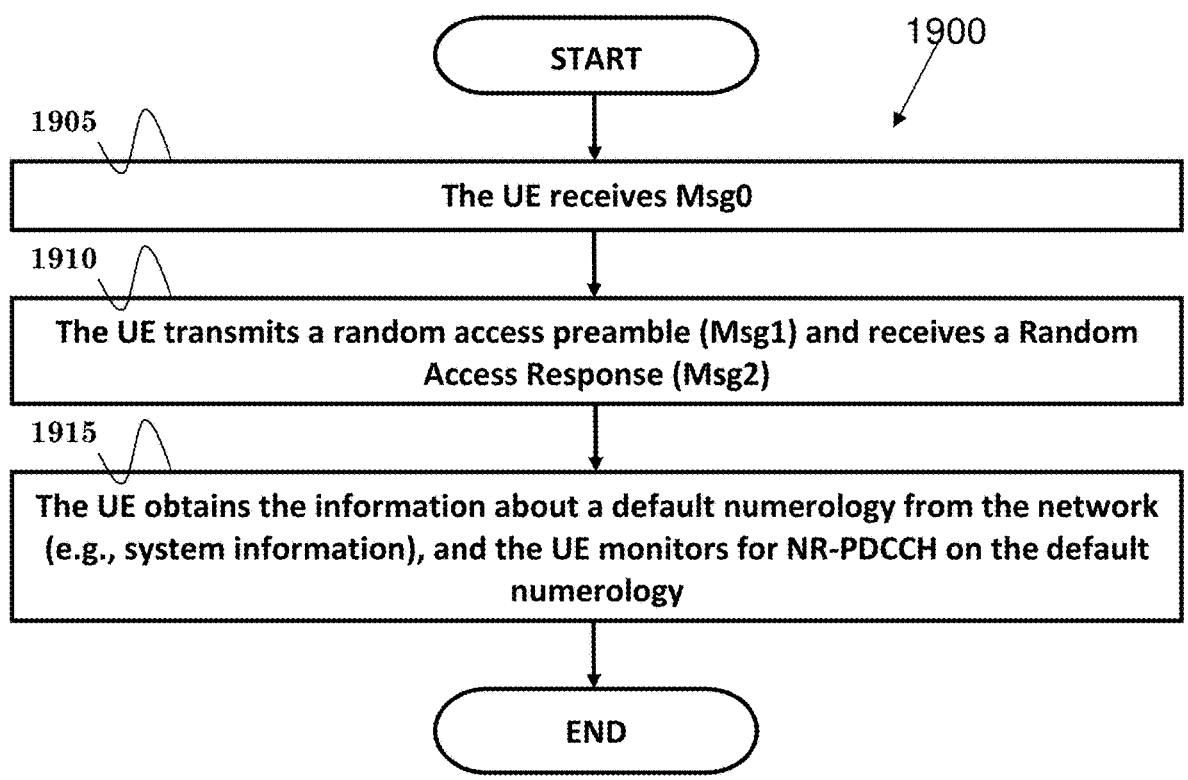
FIG. 19 is a flow chart according to one exemplary embodiment.

As another solution, the UE monitors the default numerology for NR-PDCCH after reception of a Random Access Response for the preamble not selected by the UE. The information of the default numerology may be broadcast in system information or explicitly defined in the standards. It is assumed that specific radio bearer (e.g., signaling radio bearer) may be mapped to default numerology. An example of the invention is shown in FIG. 19 according to one embodiment of a UE. In step 1905, the UE receives Msg0. In step 1910, The UE transmits a random access preamble (Msg1) and receives a Random Access Response (Msg2). In step 1915, the UE obtains the information about a default numerology from the network (e.g., system information), and the UE monitors for NR-PDCCH on the default numerology.

As yet another solution, the UE transmits Msg1 on a first numerology determined according to indication included in Msg0 and monitors a second numerology (numerologies) determined according to indication included in Msg2 (i.e., RAR) for NR-PDCCH after reception of the RAR for the preamble not selected by the UE.

In all the above solutions, the numerology for Msg2 (i.e., RAR) transmission could be preferably the same as the numerology for Msg1 (i.e., preamble) transmission.

Figure 20:
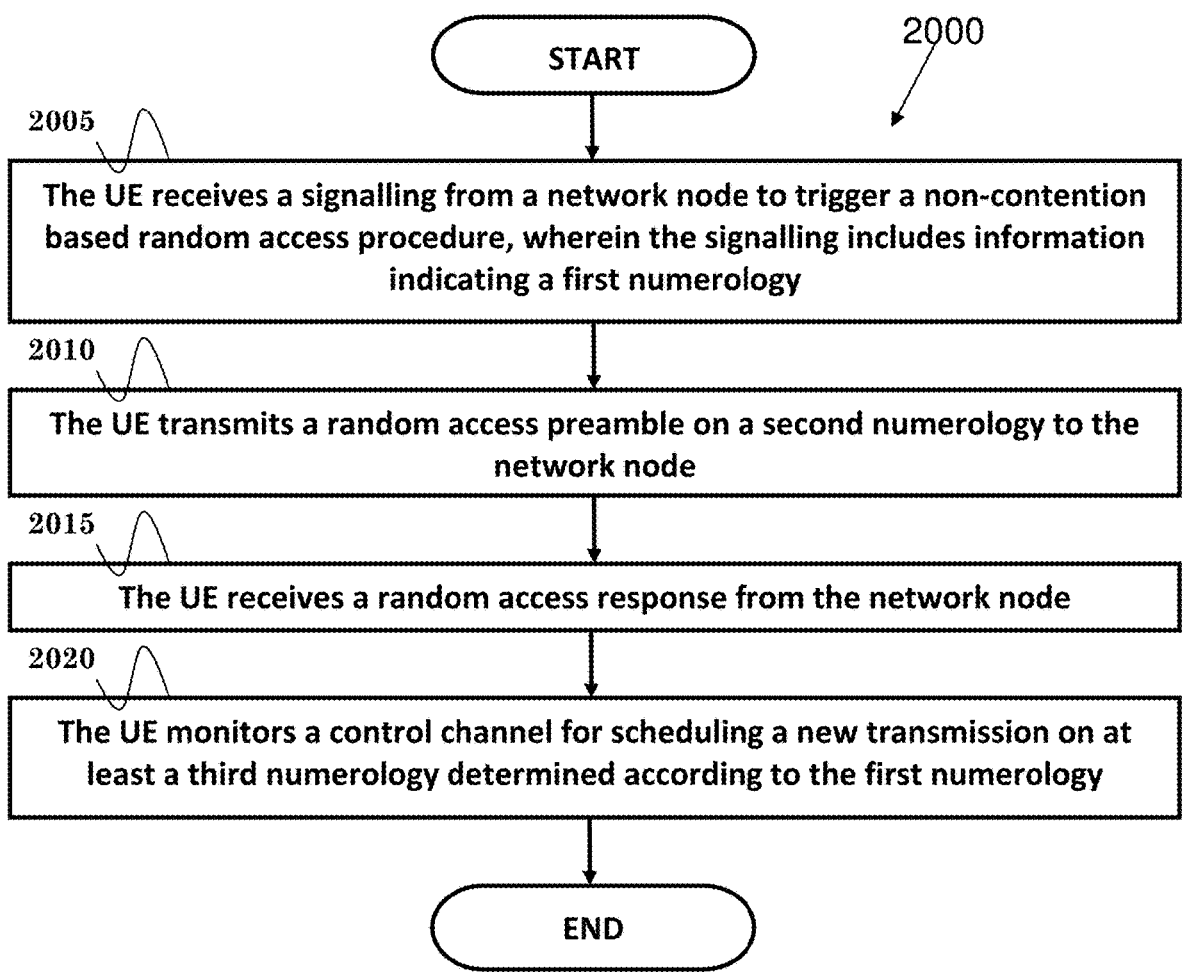
FIG. 20 is a flow chart according to one exemplary embodiment.

FIG. 20 is a flow chart 2000 according to one exemplary embodiment of a UE. In step 2005, the UE receives a signalling from a network node to trigger a non-contention based random access procedure, wherein the signalling includes information indicating a first numerology. In step 2010, the UE transmits a random access preamble on a second numerology to the network node. In step 2015, the UE receives a random access response from the network node. In step 2020, the UE monitors a control channel for scheduling a new transmission on at least a third numerology determined according to the first numerology.

Referring back to FIGS. 3 and 4, in one exemplary embodiment of a UE, the device 300 includes a program code 312 stored in the memory 310. The CPU 308 could execute program code 312 to enable the UE (i) to receive a signalling from a network node to trigger a non-contention based random access procedure, wherein the signalling includes information indicating a first numerology, (ii) to transmit a random access preamble on a second numerology to the network node, (iii) to receive a random access response from the network node, and (iv) to monitor a control channel for scheduling a new transmission on at least a third numerology determined according to the first numerology. Furthermore, the CPU 308 can execute the program code 312 to perform all of the above-described actions and steps or others described herein.

Figure 21:
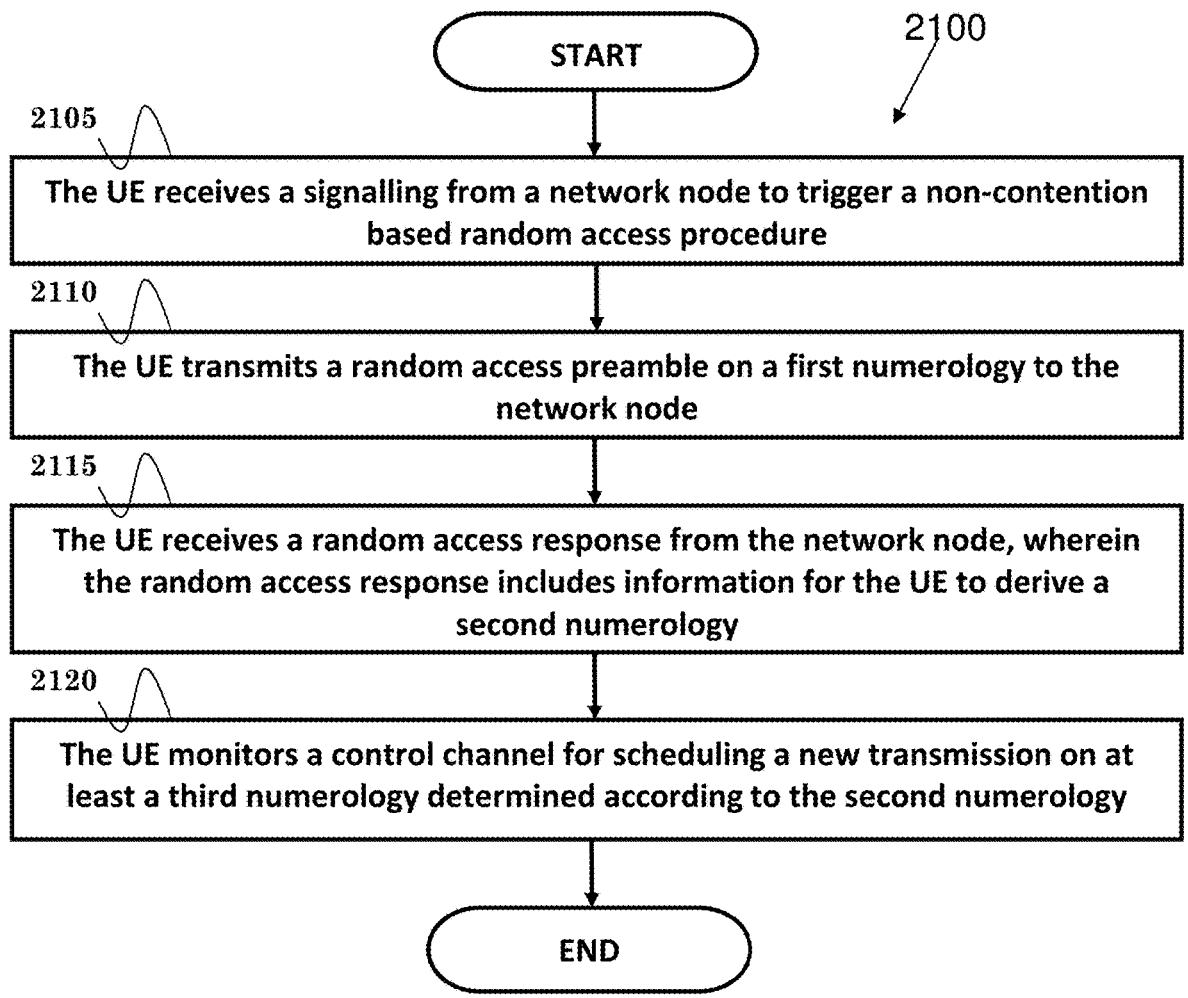
FIG. 21 is a flow chart according to one exemplary embodiment.

FIG. 21 is a flow chart 2100 according to one exemplary embodiment of a UE. In step 2105, the UE receives a signalling from a network node to trigger a non-contention based random access procedure. In step 2110, the UE transmits a random access preamble on a first numerology to the network node. In step 2115, the UE receives a random access response from the network node, wherein the random access response includes information for the UE to derive a second numerology. In step 2120, the UE monitors a control channel for scheduling a new transmission on at least a third numerology determined according to the second numerology.

Referring back to FIGS. 3 and 4, in one exemplary embodiment of a UE, the device 300 includes a program code 312 stored in the memory 310. The CPU 308 could execute program code 312 to enable the UE (i) to receive a signalling from a network node to trigger a non-contention based random access procedure, (ii) to transmit a random access preamble on a first numerology to the network node, (iii) to receive a random access response from the network node, wherein the random access response includes information for the UE to derive a second numerology, and (iv) to monitor a control channel for scheduling a new transmission on at least a third numerology determined according to the second numerology. Furthermore, the CPU 308 can execute the program code 312 to perform all of the above-described actions and steps or others described herein.

Figure 22:
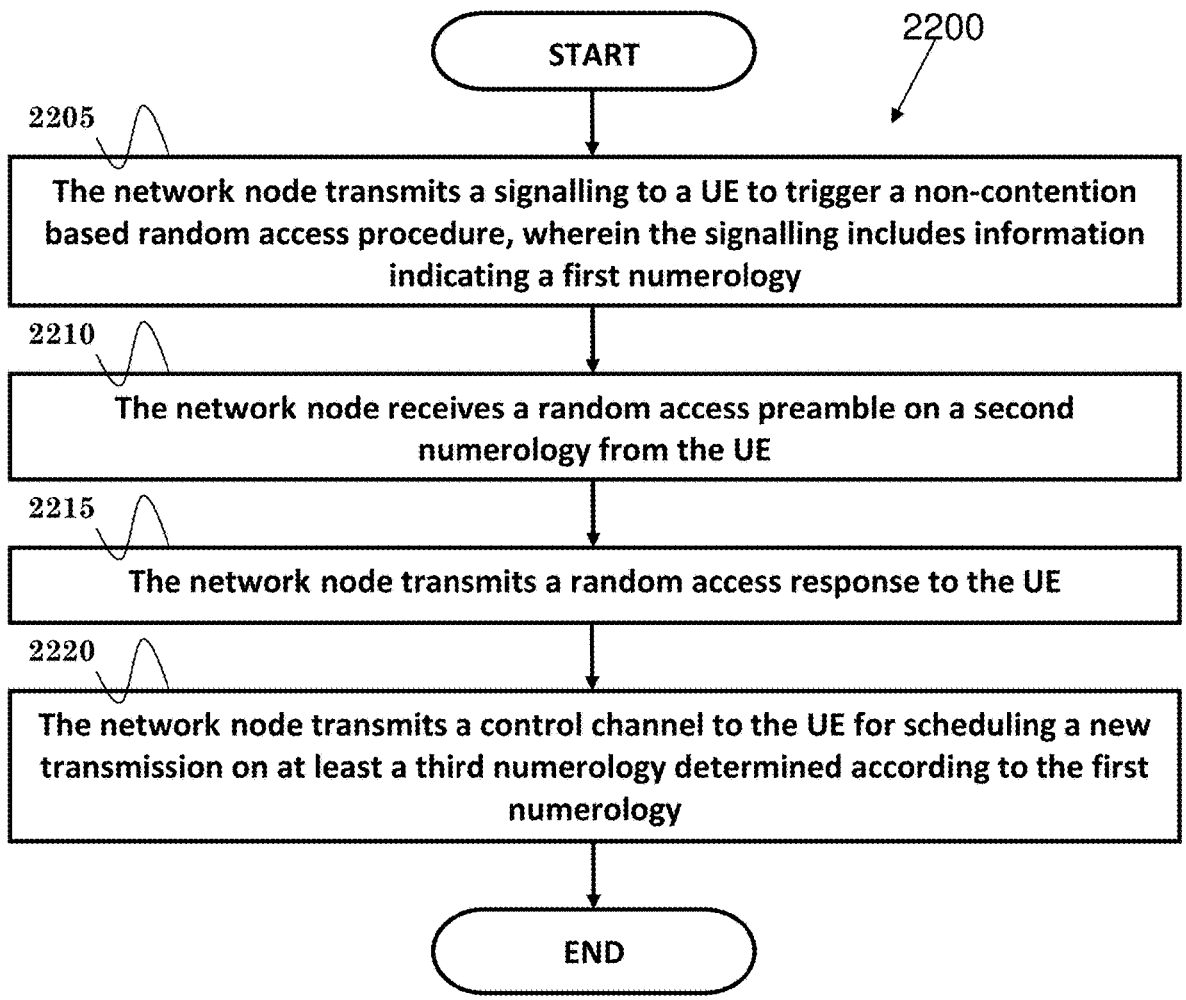
FIG. 22 is a flow chart according to one exemplary embodiment.

FIG. 22 is a flow chart 2200 according to one exemplary embodiment of a network node. In step 2205, the network node transmits a signalling to a UE to trigger a non-contention based random access procedure, wherein the signalling includes information indicating a first numerology. In step 2210, the network node receives a random access preamble on a second numerology from the UE. In step 2215, the network node transmits a random access response to the UE. In step 2220, the network node transmits a control channel to the UE for scheduling a new transmission on at least a third numerology determined according to the first numerology.

Referring back to FIGS. 3 and 4, in one exemplary embodiment of a network node, the device 300 includes a program code 312 stored in the memory 310. The CPU 308 could execute program code 312 to enable the network node (i) to transmit a signalling to a UE to trigger a non-contention based random access procedure, wherein the signalling includes information indicating a first numerology, (ii) to receive a random access preamble on a second numerology from the UE, (iii) to transmit a random access response to the UE, and (iv) to transmit a control channel to the UE for scheduling a new transmission on at least a third numerology determined according to the first numerology. Furthermore, the CPU 308 can execute the program code 312 to perform all of the above-described actions and steps or others described herein.

Figure 23:
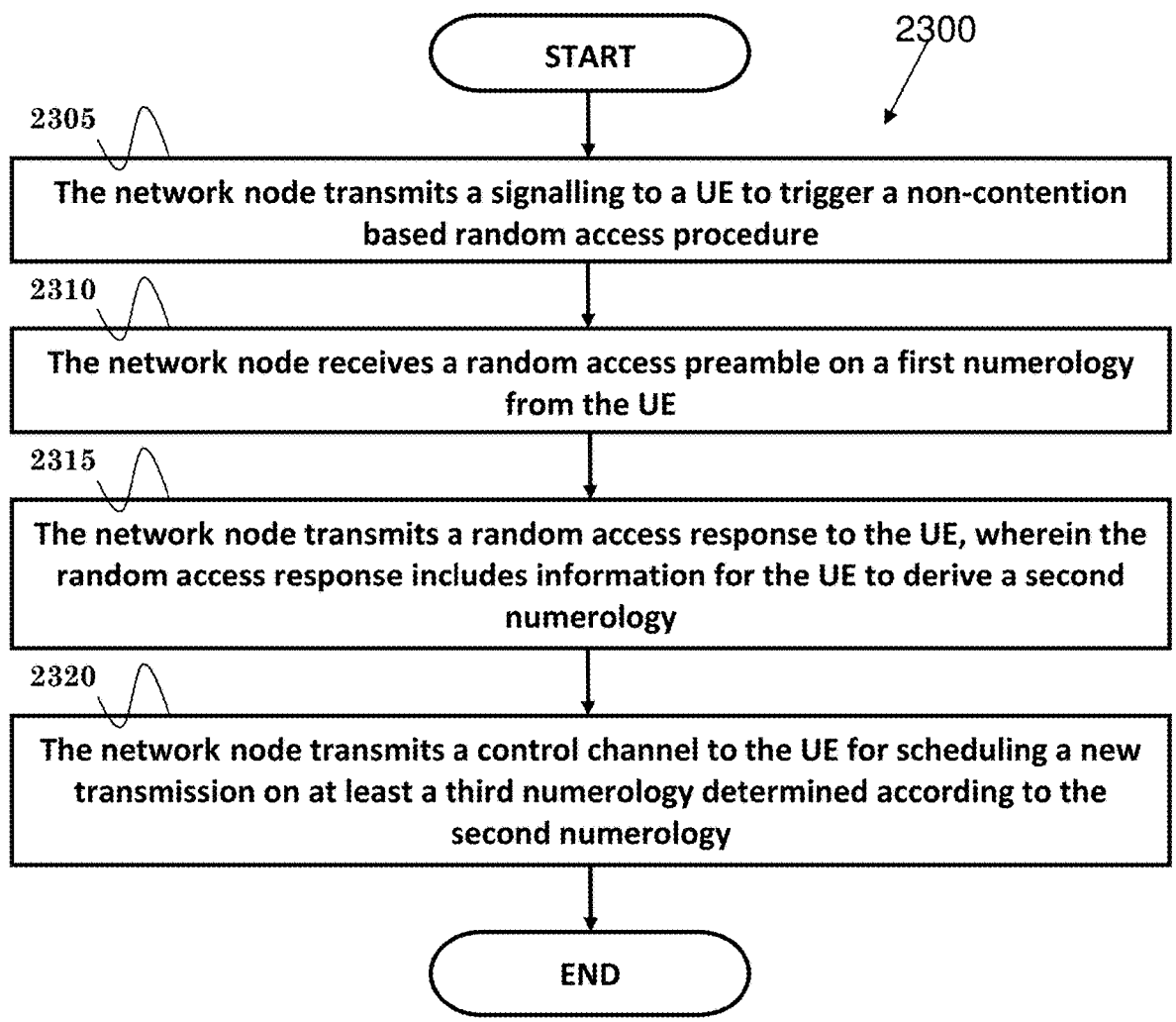
FIG. 23 is a flow chart according to one exemplary embodiment.

FIG. 23 is a flow chart 2300 according to one exemplary embodiment of a network node. In step 2305, the network node transmits a signalling to a UE to trigger a non-contention based random access procedure. In step 2310, the network node receives a random access preamble on a first numerology from the UE. In step 2315, the network node transmits a random access response to the UE, wherein the random access response includes information for the UE to derive a second numerology. In step 2320, the network node transmits a control channel to the UE for scheduling a new transmission on at least a third numerology determined according to the second numerology.

Referring back to FIGS. 3 and 4, in one exemplary embodiment of a network node, the device 300 includes a program code 312 stored in the memory 310. The CPU 308 could execute program code 312 to enable the network node (i) to transmit a signalling to a UE to trigger a non-contention based random access procedure, (ii) to receive a random access preamble on a first numerology from the UE, (iii) to transmit a random access response to the UE, wherein the random access response includes information for the UE to derive a second numerology, and (iv) to transmit a control channel to the UE for scheduling a new transmission on at least a third numerology determined according to the second numerology. Furthermore, the CPU 308 can execute the program code 312 to perform all of the above-described actions and steps or others described herein.

Figure 24:
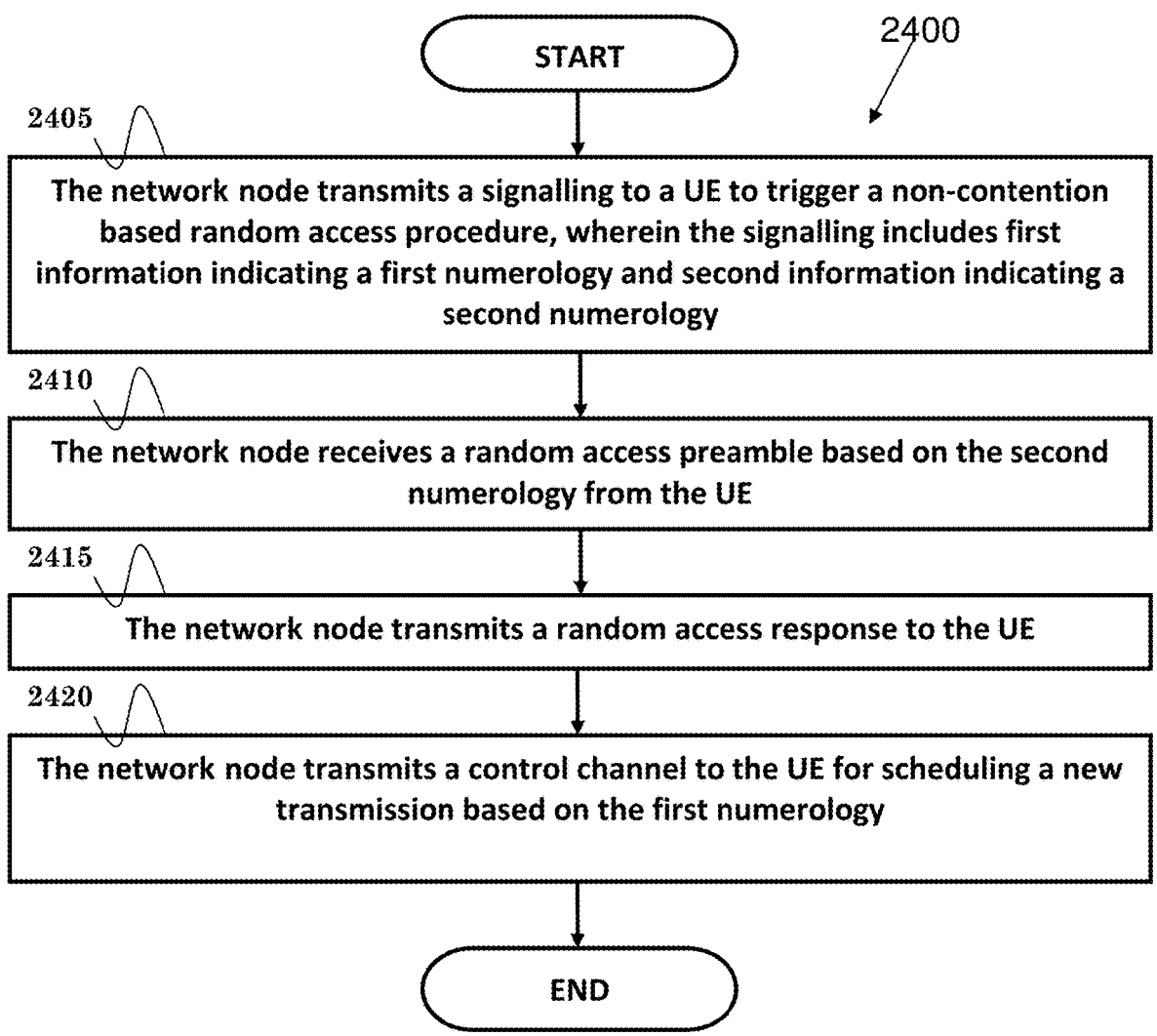
FIG. 24 is a flow chart according to one exemplary embodiment.

FIG. 24 is a flow chart 2400 according to one exemplary embodiment of a network node. In step 2405, the network node transmits a signalling to a UE to trigger a non-contention based random access procedure, wherein the signalling includes first information indicating a first numerology and second information indicating a second numerology. In step 2410, the network node receives a random access preamble based on the second numerology from the UE. In step 2415, the network node transmits a random access response to the UE. In step 2420, the network node transmits a control channel to the UE for scheduling a new transmission based on the first numerology.

Referring back to FIGS. 3 and 4, in one exemplary embodiment of a network node, the device 300 includes a program code 312 stored in the memory 310. The CPU 308 could execute program code 312 to enable the network node (i) to transmit a signalling to a UE to trigger a non-contention based random access procedure, wherein the signalling includes first information indicating a first numerology and second information indicating a second numerology, (ii) to receive a random access preamble based on the second numerology from the UE, (iii) to transmit a random access response to the UE, and (iv) to transmit a control channel to the UE for scheduling a new transmission based on the first numerology. Furthermore, the CPU 308 can execute the program code 312 to perform all of the above-described actions and steps or others described herein.

Figure 25:
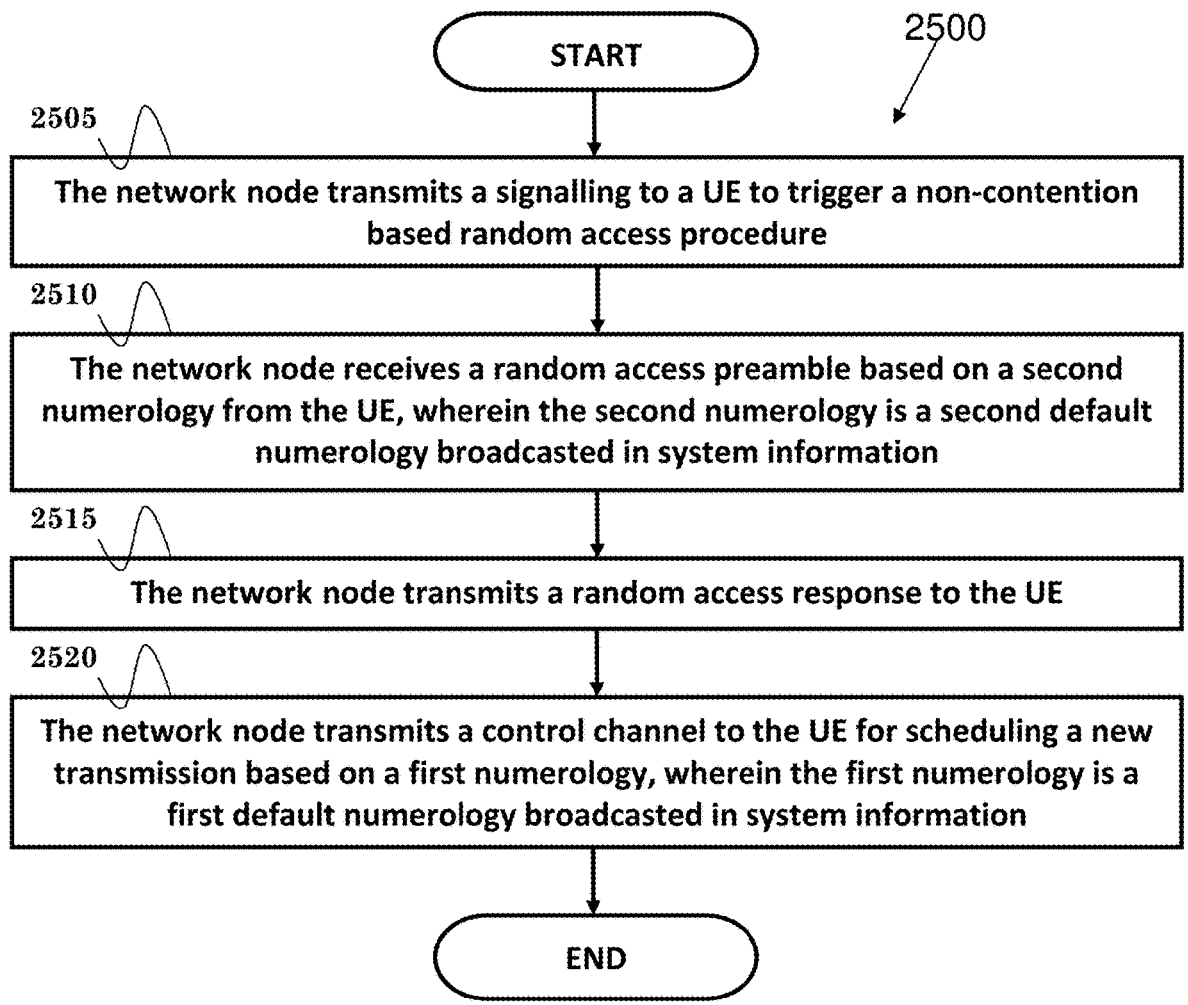
FIG. 25 is a flow chart according to one exemplary embodiment.

FIG. 25 is a flow chart 2500 according to one exemplary embodiment of a network node. In step 2505, the network node transmits a signalling to a UE to trigger a non-contention based random access procedure. In step 2510, the network node receives a random access preamble based on a second numerology from the UE, wherein the second numerology is a second default numerology broadcasted in system information. In step 2515, the network node transmits a random access response to the UE. In step 2520, the network node transmits a control channel to the UE for scheduling a new transmission based on a first numerology, wherein the first numerology is a first default numerology broadcasted in system information.

Referring back to FIGS. 3 and 4, in one exemplary embodiment of a network node, the device 300 includes a program code 312 stored in the memory 310. The CPU 308 could execute program code 312 to enable the network node (i) to transmit a signalling to a UE to trigger a non-contention based random access procedure, (ii) to receives a random access preamble based on a second numerology from the UE, wherein the second numerology is a second default numerology broadcasted in system information, (iii) to transmit a random access response to the UE, and (iv) to transmit a control channel to the UE for scheduling a new transmission based on a first numerology, wherein the first numerology is a first default numerology broadcasted in system information. Furthermore, the CPU 308 can execute the program code 312 to perform all of the above-described actions and steps or others described herein.

Figure 26:
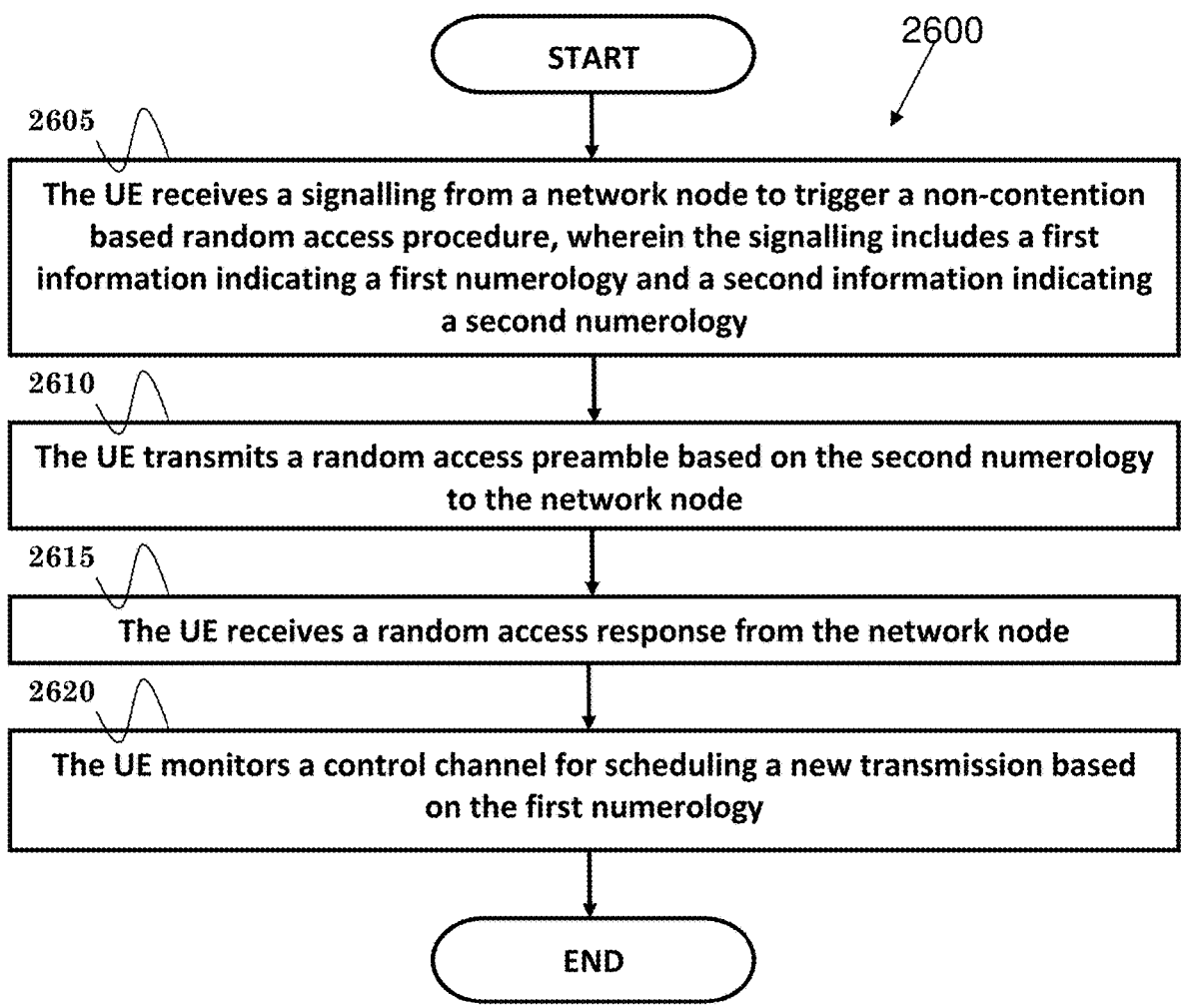
FIG. 26 is a flow chart according to one exemplary embodiment.

FIG. 26 is a flow chart 2600 according to one exemplary embodiment of a UE. In step 2605, the UE receives a signalling from a network node to trigger a non-contention based random access procedure, wherein the signalling includes a first information indicating a first numerology and a second information indicating a second numerology. In step 2610, the UE transmits a random access preamble based on the second numerology to the network node. In step 2615, the UE receives a random access response from the network node. In step 2620, the UE monitors a control channel for scheduling a new transmission based on the first numerology.

Referring back to FIGS. 3 and 4, in one exemplary embodiment of a UE, the device 300 includes a program code 312 stored in the memory 310. The CPU 308 could execute program code 312 to enable the UE (i) to receive a signalling from a network node to trigger a non-contention based random access procedure, wherein the signalling includes a first information indicating a first numerology and a second information indicating a second numerology, (ii) to transmit a random access preamble based on the second numerology to the network node, (iii) to monitor a control channel for scheduling a new transmission based on the first numerology. Furthermore, the CPU 308 can execute the program code 312 to perform all of the above-described actions and steps or others described herein.

Figure 27:
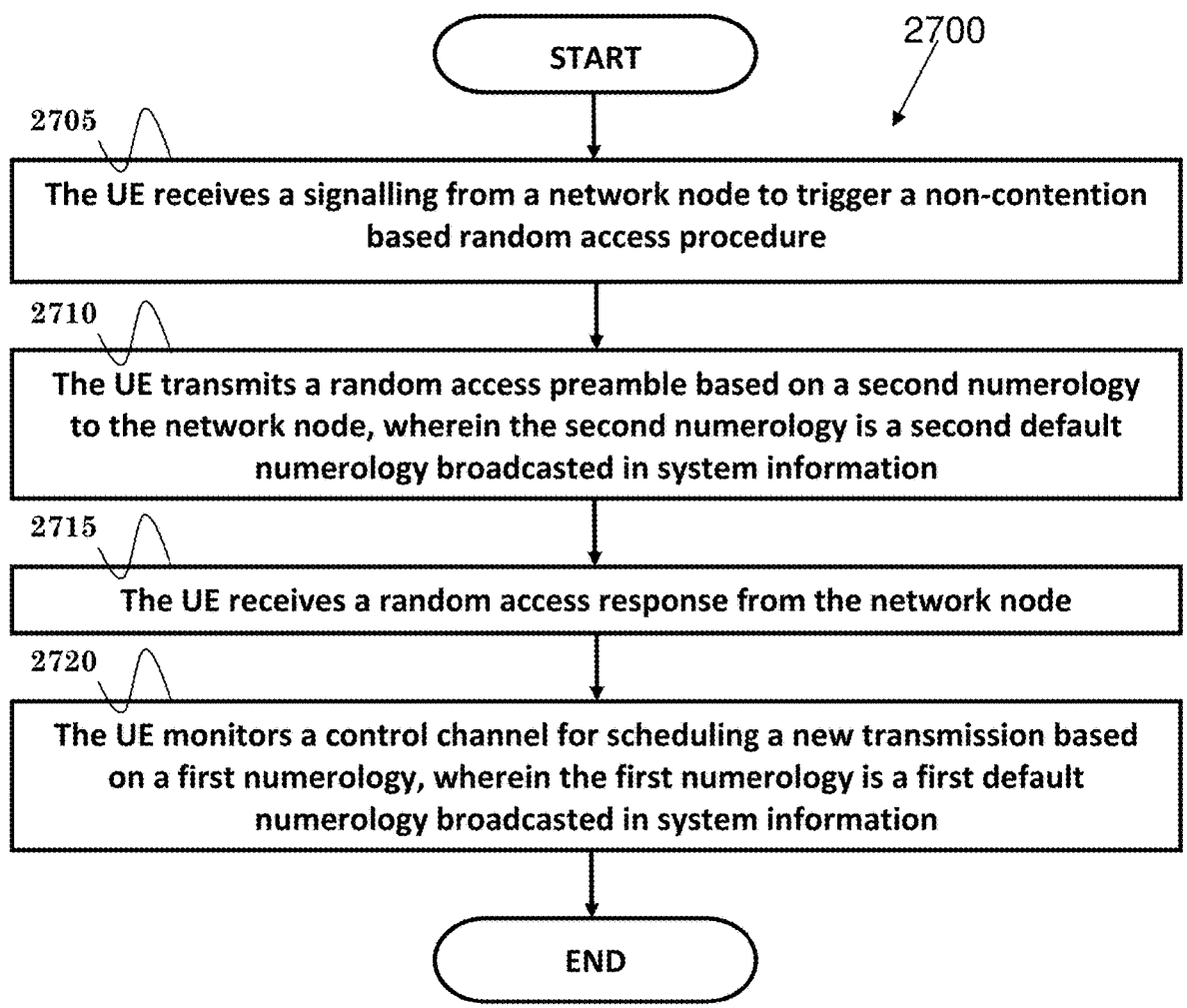
FIG. 27 is a flow chart according to one exemplary embodiment.

FIG. 27 is a flow chart 2700 according to one exemplary embodiment of a UE. In step 2705, the UE receives a signalling from a network node to trigger a non-contention based random access procedure. In step 2710, the UE transmits a random access preamble based on a second numerology to the network node, wherein the second numerology is a second default numerology broadcasted in system information. In step 2715, the UE receives a random access response from the network node. In step 2720, the UE monitors a control channel for scheduling a new transmission based on a first numerology, wherein the first numerology is a first default numerology broadcasted in system information.

Referring back to FIGS. 3 and 4, in one exemplary embodiment of a UE, the device 300 includes a program code 312 stored in the memory 310. The CPU 308 could execute program code 312 to enable the UE (i) to receive a signalling from a network node to trigger a non-contention based random access procedure, wherein the signalling includes a first information indicating a first numerology and a second information indicating a second numerology, (ii) to transmit a random access preamble based on the second numerology to the network node, (iii) to monitor a control channel for scheduling a new transmission based on the first numerology. Furthermore, the CPU 308 can execute the program code 312 to perform all of the above-described actions and steps or others described herein.

In the context of the embodiments shown in FIGS. 20-27 and described in the text above, in one embodiment, the signalling could be a PDCCH order or a Handover Command.

In one embodiment, the second numerology could be equal to the first numerology. The second numerology could also be included in the signalling. Furthermore, the second numerology could be a default numerology broadcasted in system information or defined in 3GPP standards. The second numerology could be selected by the UE from multiple numerologies configured by the network node.

In one embodiment, the third numerology is equal to the first numerology. The third numerology could be the numerology which can schedule transmission resources of the first numerology.

In one embodiment, a mapping between the first numerology and the third numerology could be configured by the network node. Furthermore, the mapping between the first numerology and the third numerology could be broadcasted in system information or defined in 3GPP standards.

In one embodiment, the control channel could be PDCCH and/or NR-PDCCH. The new transmission could be a DL transmission or an UL transmission.

In one embodiment, each numerology corresponds to a subcarrier spacing in a frequency domain.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method of a UE (User Equipment), comprising:
receiving a Handover Command from a network node to trigger a non-contention based random access procedure, wherein the Handover Command includes a first information indicating a first numerology and a second information indicating a second numerology;
transmitting a random access preamble based on the second numerology to the network node;
receiving a random access response from the network node; and
monitoring a control channel for scheduling a new transmission based on the first numerology after reception of the random access response.

2. The method of claim 1, wherein the control channel is PDCCH (Physical Downlink Control Channel) and/or NR-PDCCH (New Radio Access Technology-PDCCH).

3. The method of claim 1, wherein the new transmission is a DL (Downlink) transmission or an Uplink (UL) transmission.

4. The method of claim 1, wherein each numerology corresponds to a subcarrier spacing in a frequency domain.

5. A method of a UE (User Equipment), comprising:
receiving a PDCCH (Physical Downlink Control Channel) order from a network node to trigger a non-contention based random access procedure;
transmitting a random access preamble based on a second numerology to the network node, wherein the second numerology is a second default numerology broadcasted in system information;
receiving a random access response from the network node; and
monitoring a control channel for scheduling a new transmission based on a first numerology after reception of the random access response, wherein the first numerology is a first default numerology broadcasted in system information.

6. The method of claim 5, wherein the control channel is PDCCH (Physical Downlink Control Channel) and/or NR-PDCCH (New Radio Access Technology-PDCCH).

7. The method of claim 5, wherein the new transmission is a DL (Downlink) transmission or an Uplink (UL) transmission.

8. The method of claim 5, wherein each numerology corresponds to a subcarrier spacing in a frequency domain.

9. A User Equipment (UE), comprising:
a control circuit;
a processor installed in the control circuit; and
a memory installed in the control circuit and operatively coupled to the processor;
wherein the processor is configured to execute a program code stored in the memory to:
receive a Handover Command from a network node to trigger a non-contention based random access procedure, wherein the Handover Command includes a first information indicating a first numerology and a second information indicating a second numerology;
transmit a random access preamble based on the second numerology to the network node;
receive a random access response from the network node; and
monitor a control channel for scheduling a new transmission based on the first numerology after reception of the random access response.

10. A User Equipment (UE), comprising:
a control circuit;
a processor installed in the control circuit; and
a memory installed in the control circuit and operatively coupled to the processor;
wherein the processor is configured to execute a program code stored in the memory to:
receive a PDCCH (Physical Downlink Control Channel) order from a network node to trigger a non-contention based random access procedure;
transmit a random access preamble based on a second numerology to the network node, wherein the second numerology is a second default numerology broadcasted in system information;
receive a random access response from the network node; and
monitor a control channel for scheduling a new transmission based on a first numerology after reception of the random access response, wherein the first numerology is a first default numerology broadcasted in system information.

11. A network node, comprising:
a control circuit;
a processor installed in the control circuit; and
a memory installed in the control circuit and operatively coupled to the processor;
wherein the processor is configured to execute a program code stored in the memory to:
transmitting a Handover Command to a User Equipment (UE), to trigger a non-contention based random access procedure, wherein the Handover Command includes a first information indicating a first numerology and a second information indicating a second numerology;
receive a random access preamble based on the second numerology from the UE;
transmit a random access response to the UE; and
transmitting a control channel to the UE for scheduling a new transmission based on the first numerology after transmission of the random access response.

12. The network node of claim 11, wherein each numerology corresponds to a subcarrier spacing in a frequency domain.

13. The network node of claim 11, wherein the control channel is Physical Downlink Control Channel (PDCCH) or New Radio Access Technology-PDCCH (NR-PDCCH).

14. The network node of claim 11, wherein the new transmission is a Downlink (DL) transmission or an Uplink (UL) transmission.

15. A network node, comprising:
a control circuit;
a processor installed in the control circuit; and
a memory installed in the control circuit and operatively coupled to the processor;
wherein the processor is configured to execute a program code stored in the memory to:
transmit a PDCCH (Physical Downlink Control Channel) order to a User Equipment to trigger a non-contention based random access procedure;
receive a random access preamble based on a second numerology from the UE, wherein the second numerology is a second default numerology broadcasted in system information;
transmit a random access response to the UE; and
transmit a control channel to the UE for scheduling a new transmission based on a first numerology after transmission of the random access response after transmission of the random access response, wherein the first numerology is a first default numerology broadcasted in system information.

16. The network node of claim 15, wherein each numerology corresponds to a subcarrier spacing in a frequency domain.

17. The network node of claim 15, wherein the control channel is Physical Downlink Control Channel (PDCCH) or New Radio Access Technology-PDCCH (NR-PDCCH).

18. The network node of claim 15, wherein the new transmission is a Downlink (DL) transmission or an Uplink (UL) transmission.

19. A method of a network node, comprising the steps of:
transmitting a Handover Command to a User Equipment, in the following also referred to as UE, to trigger a non-contention based random access procedure, wherein the Handover Command includes a first information indicating a first numerology and a second information indicating a second numerology;

receiving a random access preamble based on the second numerology from the UE;

transmitting a random access response to the UE; and transmitting a control channel to the UE for scheduling a new transmission based on the first numerology after transmission of the random access response.

20. A method of a network node, comprising:

transmitting a Physical Downlink Control Channel (PDCCH) order to a User Equipment (UE) to trigger a non-contention based random access procedure;

receiving a random access preamble based on a second numerology from the UE, wherein the second numerology is a second default numerology broadcasted in system information;

transmitting a random access response to the UE; and transmitting a control channel to the UE for scheduling a new transmission based on a first numerology after transmission of the random access response after transmission of the random access response, wherein the first numerology is a first default numerology broadcasted in system information.

* * * * *

UNITED STATES PATENT AND TRADEMARK OFFICE
CERTIFICATE OF CORRECTION

PATENT NO. : 10,506,632 B2
APPLICATION NO. : 15/942880
DATED : December 10, 2019
INVENTOR(S) : I-Jen Chen and Richard Lee-Chee Kuo Page 1 of 1

It is certified that error appears in the above-identified patent and that said Letters Patent is hereby corrected as shown below:

In the Claims

In Column 28, Line 48, please delete "after"
In Column 28, Line 49, please delete "transmission of the random access response"
In Column 29, Line 18, please delete "after trans-"
In Column 29, Line 19, please delete "mission of the random access response"

Signed and Sealed this
Twenty-second Day of November, 2022

Katherine Kelly Vidal
*Director of the United States Patent and Trademark Office*